[12] United States Patent
Kwak et al.

(10) Patent No.: US 11,693,427 B2
(45) Date of Patent: *Jul. 4, 2023

(54) PLURALITY OF AUTONOMOUS MOBILE ROBOTS AND CONTROLLING METHOD FOR THE SAME

(71) Applicant: LG ELECTRONICS INC., Seoul (KR)

(72) Inventors: Donghoon Kwak, Seoul (KR); Hyukdo Kweon, Seoul (KR); Jaehwan Ko, Seoul (KR)

(73) Assignee: LG ELECTRONICS INC., Seoul (KR)

(*) Notice: Subject to any disclaimer, the term of this patent is extended or adjusted under 35 U.S.C. 154(b) by 7 days.

This patent is subject to a terminal disclaimer.

(21) Appl. No.: 17/463,608

(22) Filed: Sep. 1, 2021

(65) Prior Publication Data

US 2021/0397201 A1 Dec. 23, 2021

Related U.S. Application Data

(63) Continuation of application No. 16/398,813, filed on Apr. 30, 2019, now Pat. No. 11,137,773.

(30) Foreign Application Priority Data

May 4, 2018 (KR) .................. 10-2018-0051970
Feb. 19, 2019 (KR) .................. 10-2019-0019435

(51) Int. Cl.
*G05D 1/02* (2020.01)
*G06K 7/10* (2006.01)
*G01S 5/02* (2010.01)

(52) U.S. Cl.
CPC .......... *G05D 1/0295* (2013.01); *G01S 5/0284* (2013.01); *G05D 1/024* (2013.01);
(Continued)

(58) Field of Classification Search
CPC ......... G01S 5/0284; G01S 5/16; G05D 1/024; G05D 1/0248; G05D 1/028; G05D 1/0295; G05D 2201/0203; G06K 7/10306
See application file for complete search history.

(56) References Cited

U.S. PATENT DOCUMENTS 6,233,504 B1 * 5/2001 Das .................. G06F 3/016
600/595
10,874,274 B2 * 12/2020 Haegermarck ......... A47L 11/28
(Continued)

FOREIGN PATENT DOCUMENTS

JP 2005192609 A 7/2005
JP 2014092861 A 5/2014
(Continued)

OTHER PUBLICATIONS

International Search Report in PCT/KR2019/005313 dated Aug. 16, 2019 (10 pages).
(Continued)

*Primary Examiner* — Babar Sarwar
(74) *Attorney, Agent, or Firm* — Birch, Stewart, Kolasch & Birch, LLP

(57) ABSTRACT

A plurality of autonomous mobile robots includes a first mobile robot and a second mobile robot. The first mobile robot is provided with a transmitting optical sensor for outputting laser light, and a first module for transmitting and receiving an Ultra-Wideband (UWB) signal. The second mobile robot is provided with a receiving optical sensor for receiving the laser light and a plurality of second modules for transmitting and receiving the UWB signal. A control unit of the second mobile robot determines a relative position of the first mobile robot based on the received UWB signal and a determination of whether the laser light is received by the optical sensor.

9 Claims, 17 Drawing Sheets

(52) U.S. Cl.
CPC ......... *G05D 1/028* (2013.01); *G06K 7/10306* (2013.01); *G05D 2201/0203* (2013.01)

(56) References Cited

U.S. PATENT DOCUMENTS

| | | | | |
|---|---|---|---|---|
| 11,137,773 B2* | 10/2021 | Kwak | ................... | G05D 1/0295 |
| 2006/0076039 A1* | 4/2006 | Song | .................... | G05D 1/0234 |
| | | | | 134/21 |
| 2011/0202175 A1* | 8/2011 | Romanov | ........... | A47L 11/4036 |
| | | | | 700/250 |
| 2013/0138246 A1* | 5/2013 | Gutmann | ................ | G01S 17/06 |
| | | | | 901/1 |
| 2014/0035725 A1* | 2/2014 | Bruemmer | ............. | G01C 21/00 |
| | | | | 340/8.1 |
| 2014/0203197 A1* | 7/2014 | Jeon | ........................ | G01S 17/74 |
| | | | | 250/557 |
| 2016/0202703 A1* | 7/2016 | Matsubara | ........... | G05D 1/0219 |
| | | | | 701/24 |
| 2016/0334800 A1* | 11/2016 | Han | ..................... | G05D 1/0274 |
| 2016/0353238 A1* | 12/2016 | Gherardi | ............. | H04W 84/18 |
| 2016/0357193 A1* | 12/2016 | Bruemmer | ............. | G05D 1/106 |
| 2017/0245104 A1* | 8/2017 | Klimek | ................... | H04B 17/27 |
| 2018/0242806 A1* | 8/2018 | Haegermarck | ......... | G05D 1/024 |
| 2018/0329433 A1* | 11/2018 | Zhao | .................... | G05D 1/0094 |
| 2019/0310656 A1* | 10/2019 | Suzuki | ..................... | G06N 7/00 |

FOREIGN PATENT DOCUMENTS

| | | | |
|---|---|---|---|
| KR | 20140094259 A | 7/2014 | |
| KR | 20150047893 A | 5/2015 | |
| KR | 20180039437 A | 4/2018 | |
| KR | 20180042546 A | 4/2018 | |
| WO | WO 2017/036532 | 3/2017 | |
| WO | WO-2017036532 A1 * | 3/2017 | ............. A47L 11/24 |

OTHER PUBLICATIONS

Thien-Minh Nguyen et al, "Robust Target-relative Localization with Ultra-Wideband Ranging and Communication", arxiv.org, Feb. 25, 2018, Cornell University Library, Ithaca, NY14853.

Extended Search Report issued in Application No. EP 19796087, dated Nov. 8, 2021.

* cited by examiner $$TOF = \frac{t_2 - t_1 - t_{reply}}{2}$$

$$Distance = c \times \frac{t_2 - t_1 - t_{reply}}{2}$$

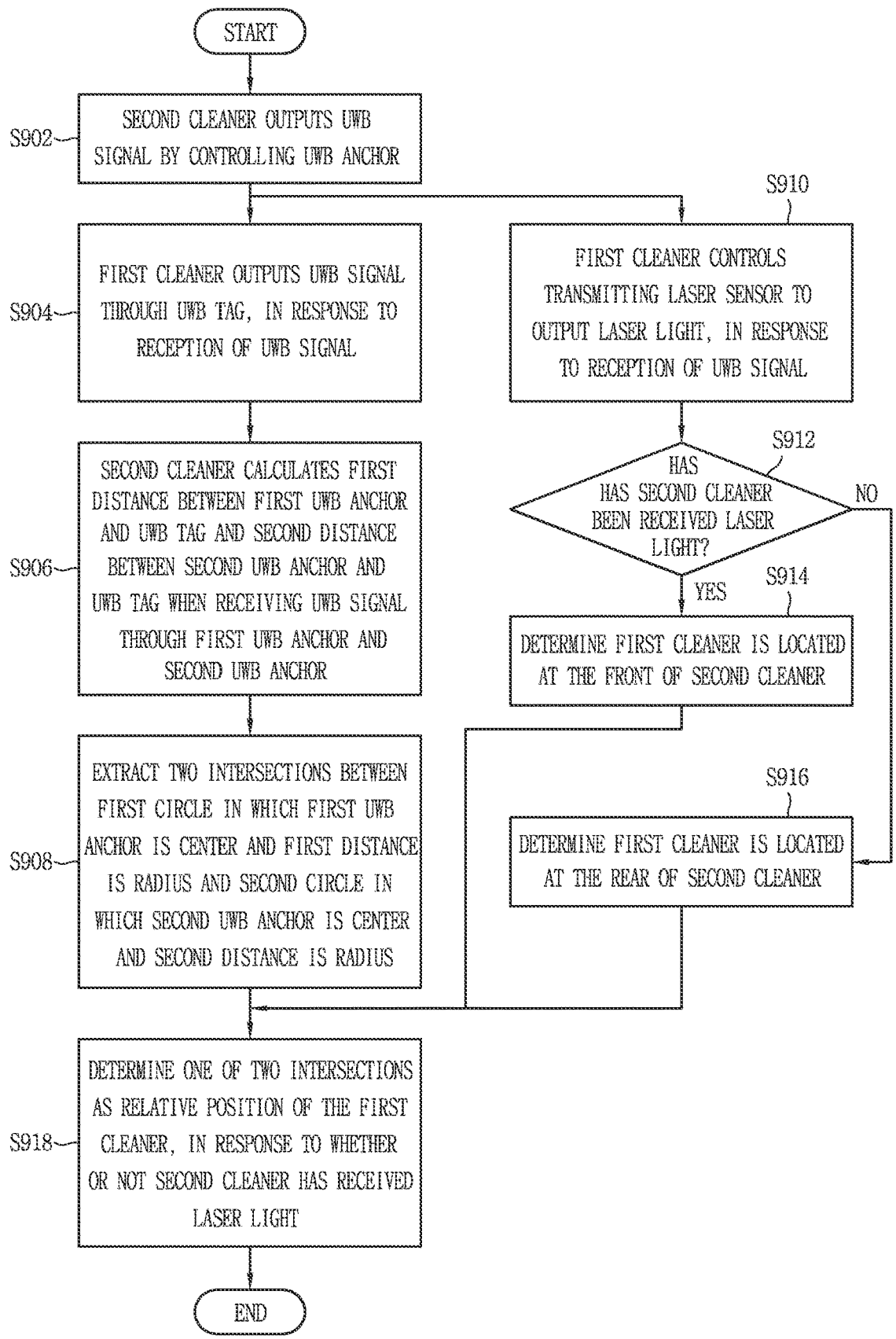

PLURALITY OF AUTONOMOUS MOBILE ROBOTS AND CONTROLLING METHOD FOR THE SAME

CROSS-REFERENCE TO RELATED APPLICATION

Pursuant to 35 U.S.C. §§ 119(a) and 120, this application is a continuation of U.S. patent application Ser. No. 16/398,813, filed Apr. 30, 2019, which claims the benefit of an earlier filing date of and the right of priority to Korean Application No. 10-2018-0051970, filed on May 4, 2018, and Korean Application No. 10-2019-0019435, filed on Feb. 19, 2019, the contents of all of which are incorporated by reference herein in their entireties.

BACKGROUND OF THE DISCLOSURE

Field

The present disclosure relates to a plurality of autonomous mobile robots.

Description of the Related Art

Generally, a mobile robot is a device that automatically performs a predetermined operation while traveling by itself in a predetermined area without a user's operation. The mobile robot senses obstacles located in the area and performs its operations by moving close to or away from such obstacles.

Such mobile robot may include a robot cleaner that performs cleaning while traveling in an area.

The robot cleaner is a cleaner that performs cleaning while traveling by itself without user's operation.

In this manner, with the development of such mobile robots performing cleaning while traveling by themselves without users' operations, necessity to make a plurality of mobile robots perform cleaning in a collaborating manner without users' operations is emerging as an interest.

The prior art document WO2017-036532 discloses a method in which a master robot cleaner (hereinafter, referred to as a master robot) controls at least one slave robot cleaner (hereinafter, referred to as a slave robot).

The prior art document discloses a configuration in which the master robot detects adjacent obstacles by using an obstacle detection device and determines its position related to the slave robot using position data derived from the obstacle detection device.

In addition, the prior art discloses a configuration in which the master robot and the slave robot perform communication with each other via a server using wireless local area network (WLAN) technology.

According to the prior art document, the master robot can determine the position of the slave robot but the slave robot cannot determine the position of the master robot.

Further, in order for the slave robot to determine (decide) the position of the master robot using the configuration disclosed in the prior art document, the master robot must transmit relative position information regarding the slave robot determined by the master robot to the slave robot through the server.

However, the prior art fails to disclose such a configuration in which the master robot transmits relative position information to the slave robot via the server.

In addition, even if it is assumed that the master robot transmits relative position information, the master robot and the slave robot should perform communication only through the server. Accordingly, such communication with the server may be disconnected when the master robot or the slave robot is located at a place where it is difficult to communicate with a server.

In this case, since the slave robot does not receive the relative position information from the server, the slave robot has difficulty in determining the relative position of the master robot, which causes a problem that seamless follow-up control of the master robot and the slave robot is not performed.

In order to perform seamless follow-up control through communication between a plurality of autonomous mobile robots, it is necessary to determine whether the master robot is located at the front or at the rear of the slave robot, or whether the slave robot is located at the front or at the rear of the master robot.

However, since the prior art document merely discloses that the master robot transmits the relative position information to the slave robot through the server, it is impossible to determine whether the master robot is located at the front or at the rear of the slave robot, or whether the slave robot is located at the front or at the rear of the master robot.

SUMMARY OF THE DISCLOSURE

One aspect of the present disclosure is to provide mobile robots, capable of performing cleaning in an optimized manner without user's intervention, and a control method thereof.

Another aspect of the present disclosure is to provide mobile robots that one of a plurality of mobile robots follows up another one in an optimized manner, and a control method thereof.

Still another aspect of the present disclosure is to provide mobile robots, capable of reducing costs of sensors used for follow-up control of a plurality of mobile robots, and a control method thereof.

Still another aspect of the present disclosure is to provide mobile robots, capable of recognizing relative positions of a plurality of mobile robots, irrespective of a communication state between the plurality of mobile robots and a server, and a control method thereof.

Still another aspect of the present disclosure is to provide mobile robots each of which is configured to recognize a direction that another robot is located with respect to the front so as to perform seamless follow-up control, and a control method thereof.

To achieve these aspects and other advantages of the present disclosure, there are provided a plurality of autonomous mobile robots, including a first mobile robot having a transmitting optical sensor for outputting laser light and a first module for transmitting and receiving an Ultra-Wideband (UWB) signal, and a second mobile robot having a receiving optical sensor for receiving the laser light and a plurality of second modules for transmitting and receiving the UWB signal, wherein the second mobile robot is provided with a control unit that determines a relative position of the first mobile robot based on the UWB signal received through the plurality of second modules and whether or not the laser light is received.

In an embodiment disclosed herein, the transmitting optical sensor and the receiving optical sensor may be infrared (IR) sensors, and the first module and the second modules transmitting and receiving the UWB signal may be UWB modules.

In an embodiment disclosed herein, the first module may be provided with a UWB tag and the second module may be provided with a UWB anchor. The first mobile robot may be provided with one transmitting optical sensor and one UWB tag, and the second mobile robot may be provided with one receiving optical sensor and two UWB anchors.

In an embodiment disclosed herein, the receiving optical sensor may receive only laser light transmitted in one direction of the second mobile robot.

In an embodiment disclosed herein, the second mobile robot may be provided with the receiving optical sensor arranged to receive only laser light transmitted from the front of the second mobile robot.

In an embodiment disclosed herein, the control unit of the second mobile robot may control the second modules to output the UWB signal, and a control unit of the first mobile robot may output the UWB signal through the first module, in response to reception of the UWB signal from the second modules.

In an embodiment disclosed herein, the second mobile robot may be provided with a first UWB anchor and a second UWB anchor included in the plurality of second modules and located at different positions, and the control unit of the second mobile robot may calculate a first distance between the first UWB anchor and the first module and a second distance between the second UWB anchor and the first module, in response to the UWB signal output from the first module being received through the first and second UWB anchors.

In an embodiment disclosed herein, the control unit of the second mobile robot may determine two intersections between a first circle, wherein the first UWB anchor is a center of the first circle and the first distance is a radius of the first circle, and a second circle, wherein the second UWB anchor is a center of the second circle and the second distance is a radius of the second circle.

In an embodiment disclosed herein, the control unit of the second mobile robot may determine one of two intersections determined through the first module and the plurality of second modules as the relative position of the first mobile robot, based on whether or not the laser light is received through the receiving optical sensor.

In an embodiment disclosed herein, the control unit of the second mobile robot may determine an intersection located at the front of the second mobile robot, of the two intersections, as the relative position of the first mobile robot, when the laser light is received through the receiving optical sensor, and determine an intersection located at the rear of the second mobile robot, of the two intersections, as the relative position of the first mobile robot, when the laser light is not received through the receiving optical sensor.

To achieve these aspects and other advantages of the present disclosure, there is provided a method for controlling a plurality of autonomous mobile robots including a first mobile robot and a second mobile robot, the method including outputting by the first mobile robot laser light and an Ultra-Wideband (UWB) signal, receiving by the second mobile robot the UWB signal, and determining by the second mobile robot a relative position of the first mobile robot, based on the received UWB signal and whether or not the laser light is received.

The present disclosure can provide a plurality of autonomous mobile robots capable of accurately determining relative position of a first mobile robot while reducing costs.

The present disclosure can provide a plurality of autonomous mobile robots, capable of reducing costs while improving accuracy by calculating two accurate intersection points using two UWB modules provided in a second mobile robot and determining whether the first mobile robot exists in the front or rear using a plurality of antennas and a blocking member.

The present disclosure can provide a plurality of autonomous mobile robots, capable of allowing seamless follow-up by always recognizing mutual relative positions, irrespective of a communication state with a server, owing to that the mutual relative positions can be recognized between the first mobile robot and the second mobile robot.

BRIEF DESCRIPTION OF THE DRAWINGS

FIGS. 8A, 8B, and 9 are conceptual views and a flowchart illustrating a method of determining relative positions of a first mobile robot and a second mobile robot using UWB modules and laser sensors according to one embodiment of the present disclosure.

DETAILED DESCRIPTION OF THE DISCLOSURE

Hereinafter, autonomous mobile robots according to the present disclosure will be described in detail with reference to the accompanying drawings.

Hereinafter, description will be given in detail of embodiments disclosed herein. Technical terms used in this specification are merely used for explaining specific embodiments, and should not be constructed to limit the scope of the technology disclosed herein.

First, the term "mobile robot" disclosed herein may be used as the same meaning as 'robot (for a specific function),' 'robot cleaner,' 'robot for cleaning' and 'autonomous cleaner,' and those terms will be used equally.

A "plurality of mobile robots" disclosed in the present disclosure may be used as a "plurality of robot cleaners" or "a plurality of cleaners". Also, a "first mobile robot" may be named "first robot", "first robot cleaner", "first cleaner", or "leading or master cleaner". Further, a "second mobile robot" may be named as "second robot", "second robot cleaner", "second cleaner", or "following or slave cleaner".

Figure 1:
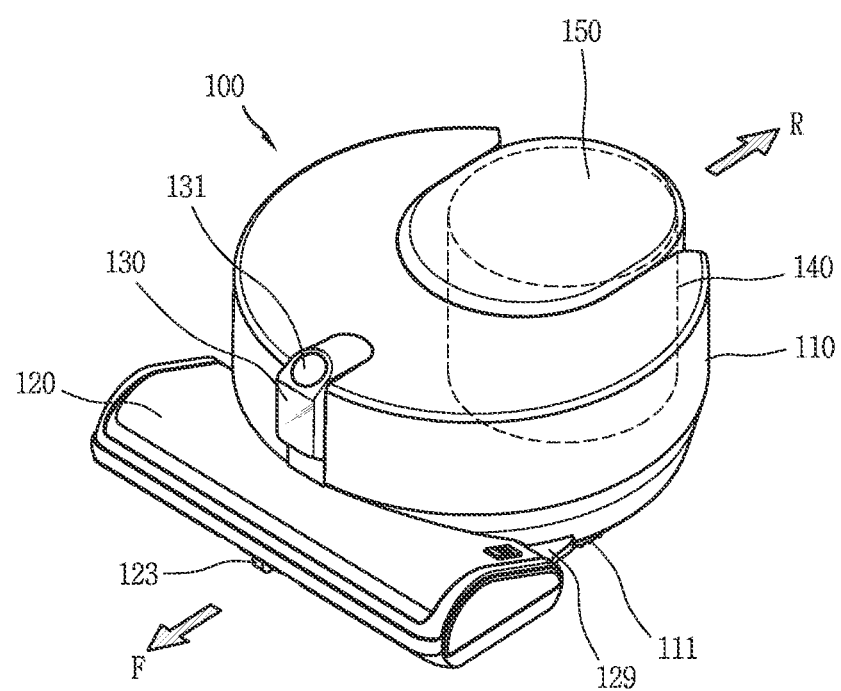
FIG. 1 is a perspective view illustrating one embodiment of a robot cleaner according to the present disclosure.
Figure 2:
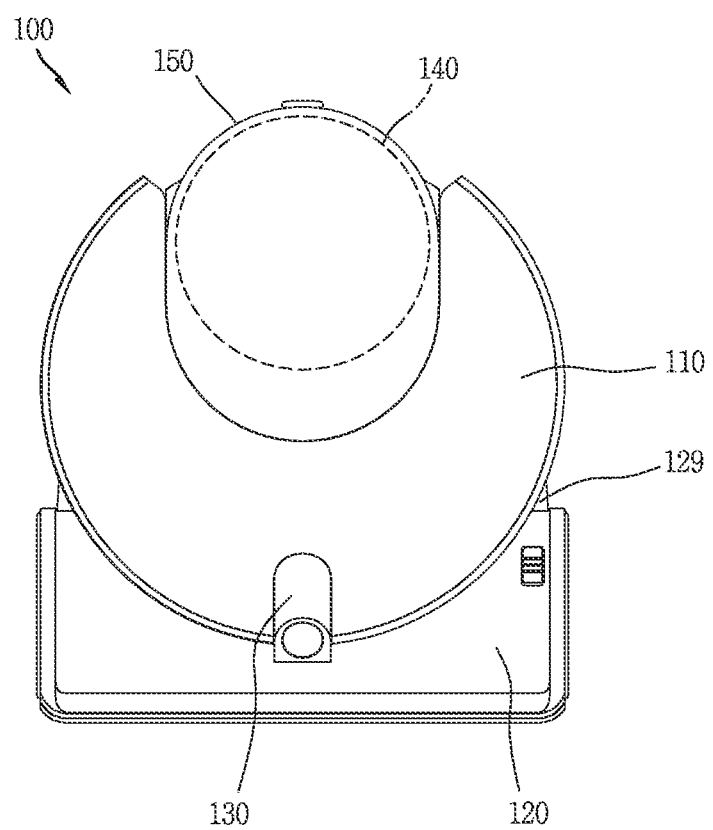
FIG. 2 is a planar view of the autonomous mobile robot illustrated in FIG. 1.
Figure 3:
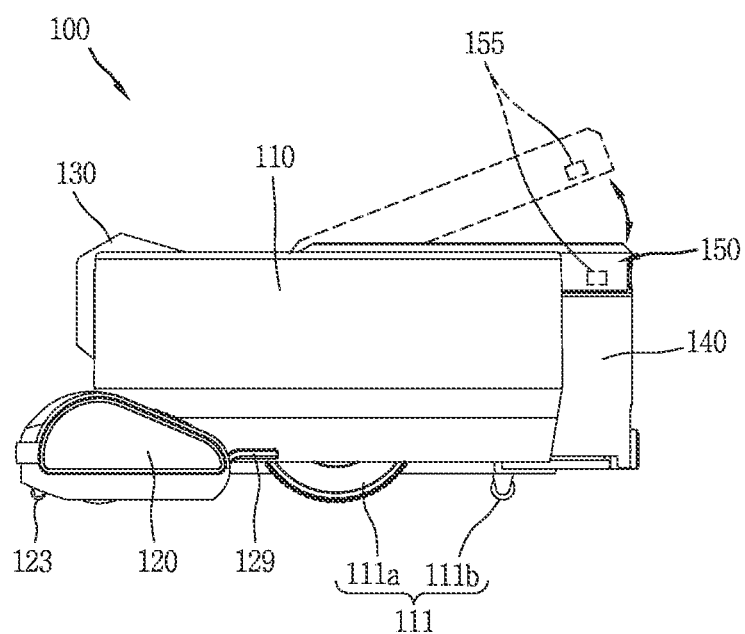
FIG. 3 is a lateral view of the autonomous mobile robot illustrated in FIG. 1.

FIGS. 1 to 3 illustrate a robot cleaner as an example of a mobile robot according to the present disclosure.

FIG. 1 is a perspective view illustrating one embodiment of an autonomous mobile robot 100 according to the present disclosure, FIG. 2 is a planar view of the autonomous mobile robot 100 illustrated in FIG. 1, and FIG. 3 is a lateral view of the autonomous mobile robot 100 illustrated in FIG. 1.

In this specification, a mobile robot, an autonomous mobile robot, and a cleaner that performs autonomous traveling may be used in the same sense. In this specification, a plurality of autonomous mobile robots may include at least part of configurations illustrated in FIGS. 1 to 3.

Referring to FIGS. 1 to 3, an autonomous mobile robot 100 performs a function of cleaning a floor while traveling on a predetermined area by itself. Cleaning the floor disclosed herein includes sucking dust (including foreign materials) on the floor or mopping the floor.

The autonomous mobile robot 100 may include a cleaner main body 110, a cleaning unit 120, a sensing unit 130, and a dust bin 140.

The cleaner main body 110 is provided with various components in addition to a controller (not illustrated) for controlling the mobile robot 100. In addition, the cleaner main body 110 is provided with a wheel unit 111 for traveling the autonomous mobile robot 100. The autonomous mobile robot 100 may be moved or rotated forward, backward, left or right by the wheel unit 111.

Referring to FIG. 3, the wheel unit 111 includes main wheels 111a and a sub wheel 111b.

The main wheels 111a are provided on both sides of the cleaner main body 110 and configured to be rotatable in one direction or another direction according to a control signal of the control unit. Each of the main wheels 111a may be configured to be driven independently of each other. For example, each main wheel 111a may be driven by a different motor. Or each main wheel 111a may be driven by a plurality of different axes provided in one motor.

The sub wheel 111b supports the cleaner main body 110 together with the main wheels 111a and assists the traveling of the autonomous mobile robot 100 by the main wheels 111a. The sub wheel 111b may also be provided on a cleaning unit 120 to be described later.

The control unit controls the driving of the wheel unit 111, so that the autonomous mobile robot 100 is allowed to autonomously run the floor.

Meanwhile, the cleaner main body 110 is provided with a battery (not shown) for supplying power to the autonomous mobile robot 100. The battery 190 may be configured to be rechargeable, and may be detachably disposed in a bottom portion of the cleaner main body 110.

In FIG. 1, a cleaning unit 120 may be disposed in a protruding form from one side of the cleaner main body 110, so as to suck air containing dust or mop an area. The one side may be a side where the cleaner main body 110 travels in a forward direction F, that is, a front side of the cleaner main body 110.

In this drawing, the cleaning unit 120 is shown having a shape protruding from one side of the cleaner main body 110 to front and both left and right sides. Specifically, a front end portion of the cleaning unit 120 is disposed at a position spaced forward apart from the one side of the cleaner main body 110, and left and right end portions of the cleaning unit 120 are disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The empty spaces are spaces between both left and right end portions of the cleaner main body 110 and both left and right end portions of the cleaning unit 120 and each has a shape recessed into the autonomous mobile robot 100.

If an obstacle is caught in the empty space, the autonomous mobile robot 100 may be likely to be unmovable due to the obstacle. To prevent this, a cover member 129 may be disposed to cover at least part of the empty space.

The cover member 129 may be provided on the cleaner main body 110 or the cleaning unit 120. In an embodiment of the present disclosure, the cover member 129 protrude from each of both sides of the rear end portion of the cleaning unit 120 and covers an outer circumferential surface of the cleaner main body 110.

The cover member 129 is disposed to fill at least part of the empty space, that is, the empty space between the cleaner main body 110 and the cleaning unit 120. This may result in realizing a structure capable of preventing an obstacle from being caught in the empty space, or to easily escape an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit 120 if the cover member 129 protrudes from the cleaner main body 110. According to this structure, when the cleaning unit 120 is impacted due to colliding with an obstacle, a part of the impact is transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user can mount the cleaning unit 120 on the cleaner main body 110 when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. That is, as the cover member 129 is disposed to cover the outer circumferential surface of the cleaner main body 110, a relative position of the cleaning unit 120 with respect to the cleaner main body 110 may be determined.

The cleaning unit 120 may be provided with a castor 123. The caster 123 assists the running of the autonomous mobile robot 100 and also supports the autonomous mobile robot 100.

The cleaner main body 110 is provided with a sensing unit 130. As illustrated, the sensing unit 130 may be disposed on one side of the cleaner main body 110 where the cleaning unit 120 is located, that is, on a front side of the cleaner main body 110.

The sensing unit 130 may be disposed to overlap the cleaning unit 120 in an up and down direction of the cleaner main body 110. The sensing unit 130 is disposed at an upper portion of the cleaning unit 120 so as to detect an obstacle or feature in front of the robot so that the cleaning unit 120 positioned at the forefront of the autonomous mobile robot 100 does not hit the obstacle.

The sensing unit 130 may be configured to additionally perform another sensing function other than the sensing function.

By way of example, the sensing unit 130 may include a camera 131 for acquiring surrounding images. The camera 131 may include a lens and an image sensor. The camera 131 may convert a surrounding image of the cleaner main body 110 into an electrical signal that can be processed by the control unit. For example, the camera 131 may transmit an electrical signal corresponding to an upward image to the control unit. The electrical signal corresponding to the upward image may be used by the control unit to detect the position of the cleaner main body 110.

In addition, the sensing unit 130 may detect obstacles such as walls, furniture, and cliffs on a traveling surface or a traveling path of the autonomous mobile robot 100. Also, the sensing unit 130 may sense presence of a docking device that performs battery charging. Also, the sensing unit 130 may detect ceiling information so as to map a traveling area or a cleaning area of the autonomous mobile robot 100.

The cleaner main body 110 is provided with a dust container 140 detachably coupled thereto for separating and collecting dust from sucked air.

The dust container 140 is provided with a dust container cover 150 which covers the dust container 140. In an embodiment, the dust container cover 150 may be coupled to the cleaner main body 110 by a hinge to be rotatable. The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 protrudes toward the rear of the cleaner main body 110 (i.e., a reverse direction R opposite to a forward direction F).

The dust container 140 is provided with an inlet through which air containing dust is introduced and an outlet through which air separated from dust is discharged. The inlet and the outlet communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 flows into the dust container 140 through the intake passage inside the cleaner main body 110 and the air is separated from the dust while passing through a filter and cyclone of the dust container 140. The separated dust is collected in the dust container 140, and the air is discharged from the dust container 140 and flows along the exhaust passage inside the cleaner main body 110 so as to be externally exhausted through an exhaust port.

Hereinafter, an embodiment related to the components of the autonomous mobile robot 100 will be described with reference to FIG. 4.

An autonomous mobile robot 100 or a mobile robot according to an embodiment of the present disclosure may include a communication unit 1100, an input unit 1200, a traveling unit 1300, a sensing unit 1400, an output unit 1500, a power supply unit 1600, a memory 1700, a control unit 1800, and a cleaning unit 1900, or a combination thereof.

Figure 4:
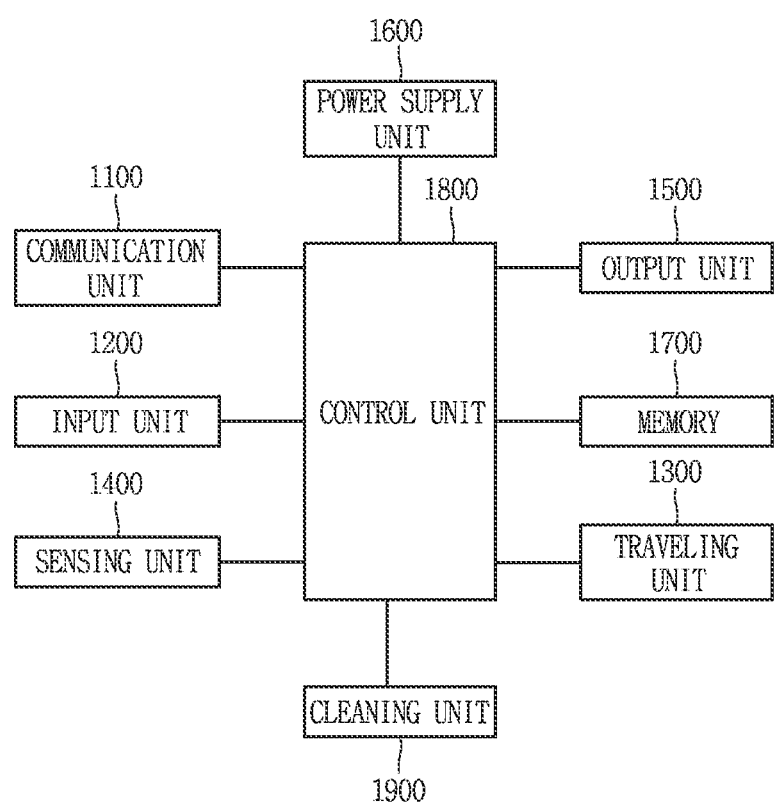
FIG. 4 is a block diagram illustrating exemplary components of an autonomous mobile robot according to one embodiment of the present disclosure.

At this time, those components shown in FIG. 4 are not essential, and an autonomous mobile robot having greater or fewer components can be implemented. Also, as described above, each of a plurality of autonomous mobile robots described in the present disclosure may equally include only some of components to be described below. That is, a plurality of autonomous mobile robots may include different components.

Hereinafter, each component will be described.

First, the power supply unit 1600 includes a battery that can be charged by an external commercial power supply, and supplies power to the mobile robot. The power supply unit 1600 supplies driving force to each of the components included in the mobile robot to supply operating power required for the mobile robot to travel or perform a specific function.

At this time, the control unit 1800 may detect a remaining amount of power (or remaining power level or battery level) of the battery. The control unit 1800 may control the mobile robot to move to a charging base connected to the external commercial power supply when the remaining power is insufficient, so that the battery can be charged by receiving charging current from the charging base. The battery may be connected to a battery sensing portion so that a remaining power level and a charging state can be transmitted to the control unit 1800. The output unit 1500 may display the remaining battery level under the control of the control unit.

The battery may be located in a bottom portion of a center of the autonomous mobile robot, or may be located in either the left or right side. In the latter case, the mobile robot may further include a balance weight to eliminate weight bias of the battery.

The control unit 1800 performs processing of information based on an artificial intelligence (AI) technology and may include one or more modules that perform at least one of learning of information, inference of information, perception of information, and processing of natural language.

The control unit 1800 may use a machine running technology to perform at least one of learning, inferring and processing a large amount of information (big data), such as information stored in the cleaner, environmental information around a mobile terminal, information stored in an external storage capable of performing communication, and the like. The control unit 1800 may control the cleaner to predict (or infer) at least one executable operation and execute an operation having the highest feasibility among the predicted at least one operation, by using the information learned using the machine running technology.

Machine learning technology is a technology that collects and learns a large amount of information based on at least one algorithm, and judges and predicts information based on the learned information. The learning of information is an operation that grasps characteristics, rules, and judgment criteria of information, quantifies relationship between information and information, and predicts new data using a quantified pattern.

The at least one algorithm used by the machine learning technology may be a statistical based algorithm, for example, a decision tree that uses a tree structure type as a prediction model, an artificial neural network copying neural network architecture and functions, genetic programming based on biological evolutionary algorithms, clustering to distribute observed examples into subsets of clusters, Monte Carlo method to compute function values through randomly extracted random numbers from probability, or the like.

As a field of machine learning technology, deep learning is a technique that performs at least one of learning, judging, and processing of information using an Artificial Neural Network (ANN) or a Deep Neuron Network (DNN) algorithm. Such DNN may have an architecture in which layers are connected to transfer data between layers. This deep learning technology may allow learning of a large amount of information through the DNN using a graphic processing unit (GPU) optimized for parallel computing.

The control unit 1800 may use training data stored in an external server or memory, and may include a learning engine mounted to detect characteristics for recognizing a predetermined object. At this time, the characteristics for recognizing the object may include a size, shape and shade of the object.

Specifically, when the control unit 1800 inputs a part of images acquired through the camera provided on the cleaner into the learning engine, the learning engine may recognize at least one object or organism included in the input images.

When the learning engine is applied to traveling of the cleaner, the control unit 1800 can recognize whether or not an obstacle such as a chair leg, a fan, and a specific shape of balcony gap, which obstruct the running of the cleaner, exists around the cleaner. This may result in enhancing efficiency and reliability of the traveling of the cleaner.

On the other hand, the learning engine may be mounted on the control unit 1800 or on an external server. When the learning engine is mounted on an external server, the control unit 1800 may control the communication unit 1100 to transmit at least one image to be analyzed, to the external server.

The external server may input the image transmitted from the cleaner into the learning engine and thus recognize at least one object or organism included in the image. In addition, the external server may transmit information related to the recognition result back to the cleaner. In this case, the information related to the recognition result may include information related to the number of objects included in the image to be analyzed and a name of each object.

On the other hand, the traveling unit 1300 may include a motor, and operate the motor to bidirectionally rotate left and right main wheels, so that the main body can rotate or move. At this time, the left and right main wheels may be independently moved. The traveling unit 1300 may advance the main body of the mobile robot forward, backward, left, right, curvedly, or in place.

On the other hand, the input unit 1200 receives various control commands for the autonomous mobile robot from the user. The input unit 1200 may include one or more buttons, for example, the input unit 1200 may include an OK button, a setting button, and the like. The OK button is a button for receiving a command for confirming detection information, obstacle information, position information, and map information from the user, and the setting button is a button for receiving a command for setting those information from the user.

In addition, the input unit 1200 may include an input reset button for canceling a previous user input and receiving a new user input, a delete button for deleting a preset user input, a button for setting or changing an operation mode, a button for receiving an input to return to the charging base.

In addition, the input unit 1200 may be implemented as a hard key, a soft key, a touch pad, or the like and may be disposed on a top of the mobile robot. For example, the input unit 1200 may implement a form of a touch screen together with the output unit 1500.

On the other hand, the output unit 1500 may be installed on a top of the mobile robot. Of course, an installation location and an installation type may vary. For example, the output unit 1500 may display a battery level state, a traveling mode or manner, or the like on a screen.

The output unit 1500 may output internal status information of the mobile robot detected by the sensing unit 1400, for example, a current status of each component included in the mobile robot. The output unit 1500 may also display external status information detected by the sensing unit 1400, obstacle information, position information, map information, and the like on the screen. The output unit 1500 may be configured as one device of a light emitting diode (LED), a liquid crystal display (LCD), a plasma display panel, and an organic light emitting diode (OLED).

The output unit 1500 may further include an audio output module for audibly outputting information related to an operation of the mobile robot executed by the control unit 1800 or an operation result. For example, the output unit 1500 may output warning sound to the outside in response to a warning signal generated by the control unit 1800.

In this case, the audio output module (not shown) may be means, such as a beeper, a speaker or the like for outputting sounds, and the output unit 1500 may output sounds to the outside through the audio output module using audio data or message data having a predetermined pattern stored in the memory 1700.

Accordingly, the mobile robot according to an embodiment of the present disclosure can output environmental information related to a traveling area through the output unit 1500 or output the same in an audible manner. According to another embodiment, the mobile robot may transmit map information or environmental information to a terminal device through the communication unit 1100 so that the terminal device outputs a screen to be output through the output unit 1500 or sounds.

The memory 1700 stores a control program for controlling or driving the autonomous mobile robot and data corresponding thereto. The memory 1700 may store audio information, image information, obstacle information, position information, map information, and the like. Also, the memory 1700 may store information related to a traveling pattern.

The memory 1700 mainly uses a nonvolatile memory. Here, the non-volatile memory (NVM, NVRAM) is a storage device that can continuously store information even when power is not supplied. Examples of the storage device include a ROM, a flash memory, a magnetic computer storage device (e.g., a hard disk, a diskette drive, a magnetic tape), an optical disk drive, a magnetic RAM, a PRAM, and the like.

On the other hand, the sensing unit 1400 may include at least one of an external signal sensor, a front sensor, a cliff sensor, a two-dimensional (2D) camera sensor, and a three-dimensional (3D) camera sensor.

The external signal sensor or external signal detection sensor may sense an external signal of a mobile robot. The external signal sensor may be, for example, an infrared ray (IR) sensor, an ultrasonic sensor, a radio frequency (RF) sensor, or the like.

The mobile robot may detect a position and direction of the charging base by receiving a guidance signal generated by the charging base using the external signal sensor. At this time, the charging base may transmit a guidance signal indicating a direction and distance so that the mobile robot can return thereto. That is, the mobile robot may determine a current position and set a moving direction by receiving a signal transmitted from the charging base, thereby returning to the charging base.

On the other hand, the front sensors or front detection sensors may be installed at a predetermined distance on the front of the mobile robot, specifically, along a circumferential surface of a side surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the control unit 1800. That is, the front sensor may detect protrusions on the moving path of the mobile robot, household appliances, furniture, walls, wall corners, and the like, and transmit the information to the control unit 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

An ultrasonic sensor, for example, may generally be used to detect a remote obstacle. The ultrasonic sensor may be provided with a transmitter and a receiver. The control unit 1800 may determine presence or non-presence of an obstacle according to whether ultrasonic waves radiated from the transmitter are reflected by an obstacle or the like and then received by the receiver, and calculate a distance from the obstacle using a ultrasonic wave radiation time and a ultrasonic wave reception time.

Also, the control unit 1800 may detect information related to a size of an obstacle by comparing ultrasonic waves radiated from the transmitter with ultrasonic waves received by the receiver. For example, the control unit 1800 may determine that the obstacle is larger in size when more ultrasonic waves are received in the receiver.

In one embodiment, a plurality (e.g., five) of ultrasonic sensors may be installed on side surfaces of the mobile robot at the front side along an outer circumferential surface. At this time, the ultrasonic sensors may preferably be installed on the front surface of the mobile robot in a manner that the transmitter and the receiver are alternately arranged.

That is, the transmitters may be disposed at right and left sides with being spaced apart from a front center of the main body or one transmitter or at least two transmitters may be disposed between the receivers so as to form a reception area of an ultrasonic signal reflected from an obstacle or the like. With this arrangement, the reception area can increase while reducing the number of sensors. A radiation angle of ultrasonic waves may be maintained in a range of avoiding an affection to different signals so as to prevent a crosstalk. Also, receiving sensitivity of the receivers may be set differently.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the mobile robot together with the ultrasonic sensor. The IR sensor may also detect an obstacle existing on a front or side of the mobile robot and transmit obstacle information to the control unit 1800. That is, the IR sensor senses a protrusion, a household fixture, furniture, a wall, a wall edge, and the like, existing on the moving path of the mobile robot, and transmits detection information to the control unit 1800. Therefore, the mobile robot can move within a specific area without collision with an obstacle.

On the other hand, a cliff sensor (or cliff detection sensor) may detect an obstacle on the floor supporting the main body of the mobile robot by mainly using various types of optical sensors.

That is, the cliff sensor may also be installed on a rear surface of the mobile robot on the floor, but may be installed on a different position depending on a type of the mobile robot. The cliff sensor is located on the rear surface of the mobile robot and detects an obstacle on the floor. The cliff sensor may be an IR sensor, an ultrasonic sensor, an RF sensor, a Position Sensitive Detector (PSD) sensor, and the like, which include a transmitter and a receiver, similar to the obstacle detection sensor.

For example, one of the cliff sensors may be installed on the front of the mobile robot, and two other cliff sensors may be installed relatively behind.

For example, the cliff sensor may be a PSD sensor, but may alternatively be configured by a plurality of different kinds of sensors.

The PSD sensor detects a short/long distance location of incident light at one p-n junction using semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. As a type of infrared sensor, the PSD sensor uses infrared rays. The PSD sensor emits infrared ray, and measures a distance by calculating an angle of the infrared ray reflected and returned from an obstacle. That is, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The control unit 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the control unit 1800 may determine whether to pass a cliff or not according to a ground state of the detected cliff by using the cliff detection sensor, and decide whether to pass the cliff or not according to the determination result. For example, the control unit 1800 determines presence or non-presence of a cliff and a depth of the cliff through the cliff sensor, and then allows the mobile robot to pass through the cliff only when a reflection signal is detected through the cliff sensor.

As another example, the control unit 1800 may also determine lifting of the mobile robot using the cliff sensor.

On the other hand, the two-dimensional camera sensor is provided on one surface of the mobile robot to acquire image information related to the surroundings of the main body during movement.

An optical flow sensor converts a lower image input from an image sensor provided in the sensor to generate image data of a predetermined format. The generated image data may be stored in the memory 1700.

Also, at least one light source may be installed adjacent to the optical flow sensor. The at least one light source emits light to a predetermined area of the floor, which is captured by the image sensor. That is, while the mobile robot moves in a specific area along the floor surface, a certain distance is maintained between the image sensor and the floor surface when the floor surface is flat. On the other hand, when the mobile robot moves on a floor surface which is not flat, the image sensor and the floor surface are spaced apart from each other by a predetermined distance due to an unevenness and an obstacle on the floor surface. At this time, the at least one light source may be controlled by the control unit 1800 to adjust an amount of light to be emitted. The light source may be a light emitting device, for example, a light emitting diode (LED), which is capable of adjusting an amount of light.

The control unit 1800 may detect a position of the mobile robot irrespective of slippage of the mobile robot, using the optical flow sensor. The control unit 1800 may compare and analyze image data captured by the optical flow sensor according to time to calculate a moving distance and a moving direction, and calculate a position of the mobile robot based on the calculated moving distance and moving direction. By using the image information regarding the lower side of the mobile robot captured by the image sensor, the control unit 1800 may perform correction that is robust against slippage with respect to the position of the mobile robot calculated by another member.

The three-dimensional (3D) camera sensor may be attached to one surface or a part of the main body of the mobile robot to generate 3D coordinate information related to surroundings of the main body.

That is, the 3D camera sensor may be a 3D depth camera that calculates a remote/near distance between the mobile robot and an object to be captured.

Specifically, the 3D camera sensor may capture 2D images related to surroundings of the main body, and generate a plurality of 3D coordinate information corresponding to the captured 2D images.

In one embodiment, the 3D camera sensor may be configured in a stereoscopic vision type which includes two or more cameras for acquiring 2D images, and merges at least two images acquired by the two or more cameras to generate a 3D coordinate information.

Specifically, the 3D camera sensor according to the embodiment may include a first pattern irradiating portion for downwardly irradiating light of a first pattern toward the front of the main body, a second pattern irradiating portion for upwardly irradiating light of a second pattern toward the front of the main body, and an image acquiring portion for acquiring a front image of the main body. Thus, the image acquiring portion may acquire an image of an area where the light of the first pattern and the light of the second pattern are incident.

In another embodiment, the 3D camera sensor may include an infrared pattern irradiating portion for irradiating an infrared pattern, in addition to a single camera, and capture a shape that the infrared pattern irradiated from the infrared pattern irradiating portion is projected onto an object to be captured, thereby measuring a distance between the 3D camera sensor and the object to be captured. The 3D camera sensor may be an IR type 3D camera sensor.

In another embodiment, the 3D camera sensor may includes a light emitting portion for emitting light, in addition to a single camera. The 3D camera sensor may receive a part of laser light (or laser beam), which is emitted from the light emitting portion and reflected from an object to be captured, and analyze the received light, thereby measuring a distance between the 3D camera sensor and the object to be captured. The 3D camera sensor may be a time-of-flight (TOF) type 3D camera sensor.

Specifically, the laser of the 3D camera sensor is configured to irradiate a laser beam extending in at least one direction. In one example, the 3D camera sensor may be provided with first and second lasers. The first laser irradiates linear laser beams intersecting each other, and the second laser irradiates single linear laser beam. According to this, the lowermost laser is used to detect an obstacle on a bottom, the uppermost laser is used to detect an obstacle on a top, and an intermediate laser between the lowermost laser and the uppermost laser is used to detect an obstacle at a middle portion.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another device located in a specific area. In this case, the another device may be any device if it can transmit and receive data through a network. For example, the another device may be an air conditioner, a heating device, an air purifier, a lamp, a TV, a vehicle, and the like. The another device may also be a device for controlling a door, a window, a water supply valve, a gas valve, or the like. The another device may also be a sensor for detecting temperature, humidity, air pressure, gas, or the like.

Further, the communication unit 1100 may communicate with another autonomous mobile robot 100 located in a specific area or within a predetermined range.

Figure 5A:
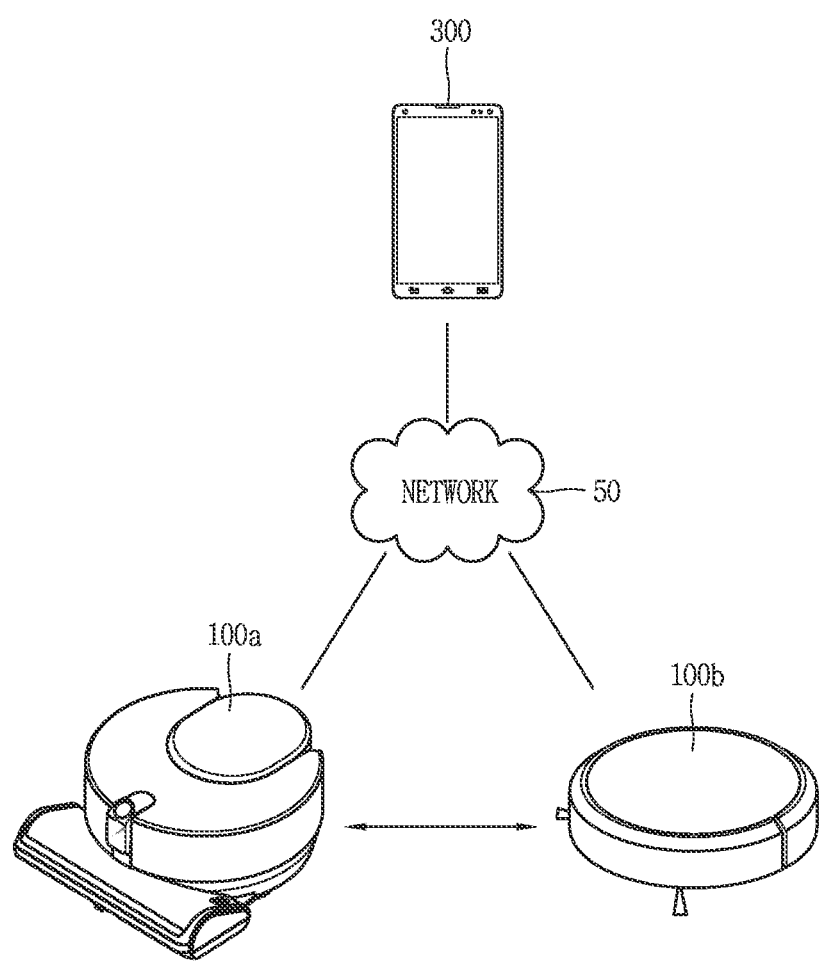
FIG. 5A is a conceptual view illustrating network communication between a plurality of autonomous mobile robots according to one embodiment of the present disclosure.
Figure 5B:
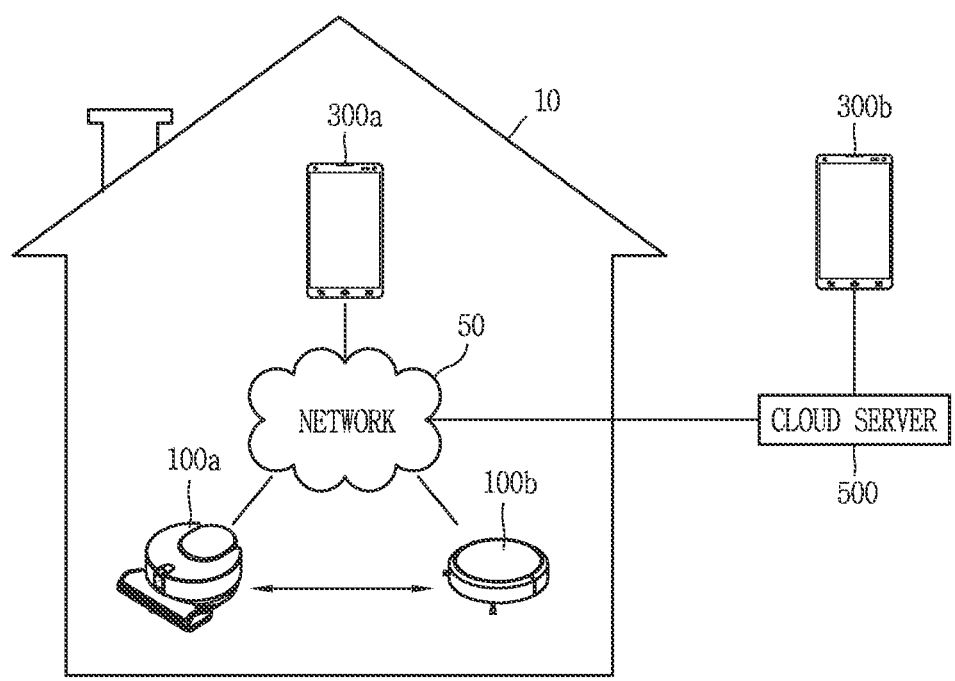
FIG. 5B is a conceptual view illustrating an example of the network communication of FIG. 5A.

Referring to FIGS. 5A and 5B, a first autonomous mobile robot 100a and a second autonomous mobile robot 100b may exchange data with each other through a network communication 50. In addition, the first autonomous mobile robot 100a and/or the second autonomous mobile robot 100b may perform a cleaning related operation or a corresponding operation by a control command received from a terminal 300 through the network communication 50 or other communication.

That is, although not shown, the plurality of autonomous mobile robots 100a and 100b may perform communication with the terminal 300 through a first network communication and perform communication with each other through a second network communication.

Here, the network communication 50 may refer to short-range communication using at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infra-red Data Association (IrDA), Ultrawide-Band (UWB), Wireless Universal Serial Bus (USB), and the like.

The network communication 50 may vary depending on a communication mode of the autonomous mobile robots desired to communicate with each other.

In FIG. 5A, the first autonomous mobile robot 100a and/or the second autonomous mobile robot 100b may provide information sensed by the respective sensing units thereof to the terminal 300 through the network communication 50. The terminal 300 may also transmit a control command generated based on the received information to the first autonomous mobile robot 100a and/or the second autonomous mobile robot 100b via the network communication 50.

In FIG. 5A, the communication unit of the first autonomous mobile robot 100a and the communication unit of the second autonomous mobile robot 100b may also directly communicate with each other or indirectly communicate with each other via another router (not shown), to recognize information related to a traveling state and positions of counterparts.

In one example, the second autonomous mobile robot 100b may perform a traveling operation and a cleaning operation according to a control command received from the first autonomous mobile robot 100a. In this case, it may be said that the first autonomous mobile robot 100a operates as a master cleaner and the second autonomous mobile robot 100b operates as a slave cleaner. Alternatively, it can be said that the second autonomous mobile robot 100b follows up the first autonomous mobile robot 100a. In some cases, it may also be said that the first autonomous mobile robot 100a and the second autonomous mobile robot 100b collaborate with each other.

Hereinafter, a system including a plurality of cleaners 100a and 100b performing autonomous traveling according to an embodiment of the present disclosure will be described with reference to FIG. 5B.

As illustrated in FIG. 5B, a cleaning system according to an embodiment of the present disclosure may include a plurality of cleaners 100a and 100b performing autonomous traveling, a network 50, a server 500, and a plurality of terminals 300a and 300b.

The plurality of cleaners 100a and 100b, the network 50 and at least one terminal 300a may be disposed in a building 10 while another terminal 300b and the server 500 may be located outside the building 10.

The plurality of cleaners 100a and 100b are cleaners that perform cleaning while traveling by themselves, and may perform autonomous traveling and autonomous cleaning. Each of the plurality of cleaners 100a and 100b may include a communication unit 1100, in addition to the traveling function and the cleaning function.

The plurality of cleaners 100a and 100b, the server 500 and the plurality of terminals 300a and 300b may be connected together through the network 50 to exchange data. To this end, although not shown, a wireless router such as an access point (AP) device and the like may further be provided. In this case, the terminal 300a located in the building (internal network) 10 may access at least one of the plurality of cleaners 100a and 100b through the AP device so as to perform monitoring, remote control and the like with respect to the cleaner. Also, the terminal 300b located in an external network may access at least one of the plurality of cleaners 100a and 100b through the AP device, to perform monitoring, remote control and the like with respect to the cleaner.

The server 500 may be wirelessly connected directly through the terminal 300b. Alternatively, the server 500 may be connected to at least one of the plurality of cleaners 100a and 100b without passing through the mobile terminal 300b.

The server 500 may include a programmable processor and may include various algorithms. By way of example, the server 500 may be provided with algorithms related to performing machine learning and/or data mining. As an example, the server 500 may include a speech recognition algorithm. In this case, when receiving voice data, the received voice data may be output by being converted into data in a text format.

The server 500 may store firmware information, operation information (course information and the like) related to the plurality of cleaners 100a and 100b, and may register product information regarding the plurality of cleaners 100a and 100b. For example, the server 500 may be a server operated by a cleaner manufacturer or a server operated by an open application store operator.

In another example, the server 500 may be a home server that is provided in the internal network 10 and stores status information regarding the home appliances or stores contents shared by the home appliances. If the server 500 is a home server, information related to foreign substances, for example, foreign substance images and the like may be stored.

Meanwhile, the plurality of cleaners 100a and 100b may be directly connected to each other wirelessly via Zigbee, Z-wave, Blue-Tooth, Ultra-wide band, and the like. In this case, the plurality of cleaners 100a and 100b may exchange position information and traveling information with each other.

At this time, any one of the plurality of cleaners 100a and 100b may be a master cleaner 100a and another may be a slave cleaner 100b.

In this case, the first mobile robot 100a may control traveling and cleaning of the second mobile robot 100b. In addition, the second mobile robot 100b may perform traveling and cleaning while following up the first mobile robot 100a. Here, the operation or action that the second mobile robot 100b follows up the first mobile robot 100a refers to that the second mobile robot 100b performs traveling and cleaning while following up the first mobile robot 100a with maintaining a proper distance from the first mobile robot 100a.

Figure 5C:
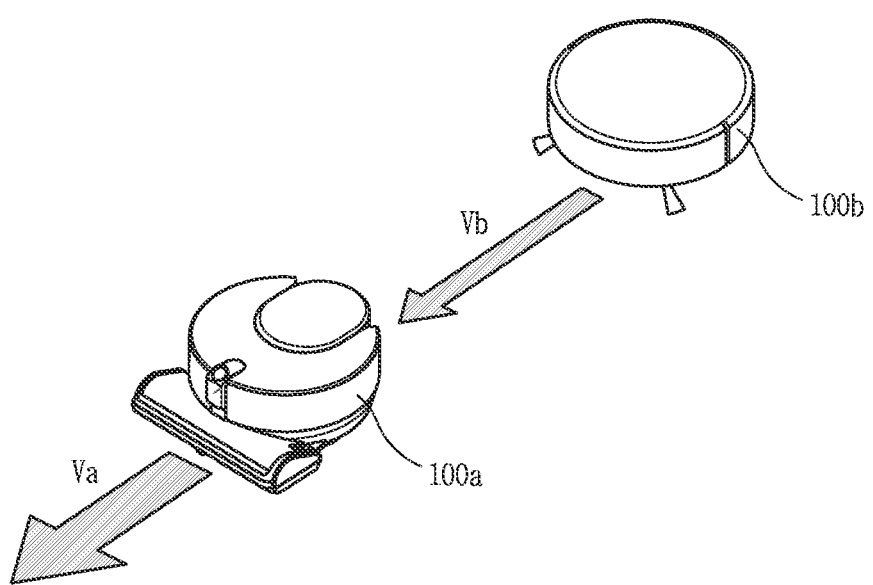
FIG. 5C is a conceptual view illustrating follow-up traveling of a plurality of autonomous mobile robots according to one embodiment of the present disclosure.

Referring to FIG. 5C, the first mobile robot 100a controls the second mobile robot 100b such that the second mobile robot 100b follows up the first mobile robot 100a.

For this purpose, the first mobile robot 100a and the second mobile robot 100b should exist in a specific area where they can communicate with each other, and the second mobile robot 100b should recognize at least a relative position of the first mobile robot 100a.

For example, the communication unit of the first mobile robot 100a and the communication unit of the second mobile robot 100b exchange IR signals, ultrasonic signals, carrier frequencies, impulse signals, and the like, and analyze them through triangulation, so as to calculate movement displacements of the first mobile robot 100a and the second mobile robot 100b, thereby recognizing relative positions of the first mobile robot 100a and the second mobile robot 100b. However, the present disclosure is not limited to this method, and one of the various wireless communication technologies described above may be used to recognize the relative positions of the first mobile robot 100a and the second mobile robot 100b through triangulation or the like.

When the first mobile robot 100a recognizes the relative position with the second mobile robot 100b, the second mobile robot 100b may be controlled based on map information stored in the first mobile robot 100a or map information stored in the server, the terminal or the like. In addition, the second mobile robot 100b may share obstacle information sensed by the first mobile robot 100a. The second mobile robot 100b may perform an operation based on a control command (for example, a control command related to a traveling direction, a traveling speed, a stop, etc.) received from the first mobile robot 100a.

Specifically, the second mobile robot 100b performs cleaning while traveling along a traveling path of the first mobile robot 100a. However, the traveling directions of the first mobile robot 100a and the second mobile robot 100b do not always coincide with each other. For example, when the first mobile robot 100a moves or rotates up/down/right/left, the second mobile robot 100b may move or rotate up/down/right/left after a predetermined time, and thus current advancing directions of the first and second mobile robot 100a and 100b may differ from each other.

Also, a traveling speed Va of the first mobile robot 100a and a traveling speed Vb of the second mobile robot 100b may be different from each other.

The first mobile robot 100a may control the traveling speed Vb of the second mobile robot 100b to be varied in consideration of a distance at which the first mobile robot 100a and the second mobile robot 100b can communicate with each other. For example, if the first mobile robot 100a and the second mobile robot 100b move away from each other by a predetermined distance or more, the first mobile robot 100a may control the traveling speed Vb of the second mobile robot 100b to be faster than before. On the other hand, when the first mobile robot 100a and the second mobile robot 100b move close to each other by a predetermined distance or less, the first mobile robot 100a may control the traveling speed Vb of the second mobile robot 100b to be slower than before or control the second mobile robot 100b to stop for a predetermined time. Accordingly, the second mobile robot 100b can perform cleaning while continuously following up the first mobile robot 100a.

According to the present disclosure, the first mobile robot 100a may be provided with reception sensors on front and rear sides, so that the control unit of the first mobile robot 100a can recognize a receiving direction of an optical signal received from the second mobile robot 100b by distinguishing the front and rear sides. To this end, a UWB module may be provided at the rear of the first mobile robot 100a and another UWB module or a plurality of optical sensors may be disposed at the front of the first mobile robot 100a in a spacing manner. The first mobile robot 100a may recognize a receiving direction of an optical signal received from the second mobile robot 100b and determine whether the second mobile robot 100b is coming from behind it or is located at the front of it.

The first autonomous mobile robot 100a of the present disclosure may be referred to as a first mobile robot or a first mobile robot 100a and the second autonomous mobile robot 100b may be referred to as a second mobile robot or a second mobile robot 100b.

In this specification, the first autonomous mobile robot 100a will be referred to as a first mobile robot 100a and the second autonomous mobile robot 100b will be referred to as a second mobile robot 100b.

In this specification, for the sake of convenience of explanation, the first mobile robot 100a serves as a leading cleaner that travels in a direction ahead of the second mobile robot 100b, and the second mobile robot 100b serves as a following cleaner that follows up the first mobile robot 100a.

The first and second mobile robots 100a and 100b may perform traveling and cleaning in a following manner without user's intervention.

To this end, it is necessary that the first mobile robot 100a recognizes the position of the second mobile robot 100b or the second mobile robot 100b recognizes the position of the first mobile robot 100a. This may mean that the relative positions of the first mobile robot 100a and the second mobile robot 100b must be determined.

The present disclosure can grasp the relative positions of the first mobile robot 100a and the second mobile robot 100b by using various methods.

For example, the communication unit of the first mobile robot 100a and the communication unit of the second mobile robot 100b exchange IR signals, ultrasonic signals, carrier frequencies, impulse signals, and the like, and recognize the relative positions of the first mobile robot 100a and the second mobile robot 100b through triangulation using the exchanged signals.

In addition, the present disclosure can recognize the relative positions of the first mobile robot 100a and the second mobile robot 100b through triangulation using one of the various wireless communication technologies described above (e.g., Zigbee, Z-wave, Blue-Tooth and Ultra-wide Band).

Since the triangulation method for obtaining the relative positions of the two devices is a general technique, a detailed description thereof will be omitted in this specification.

Figure 6A:
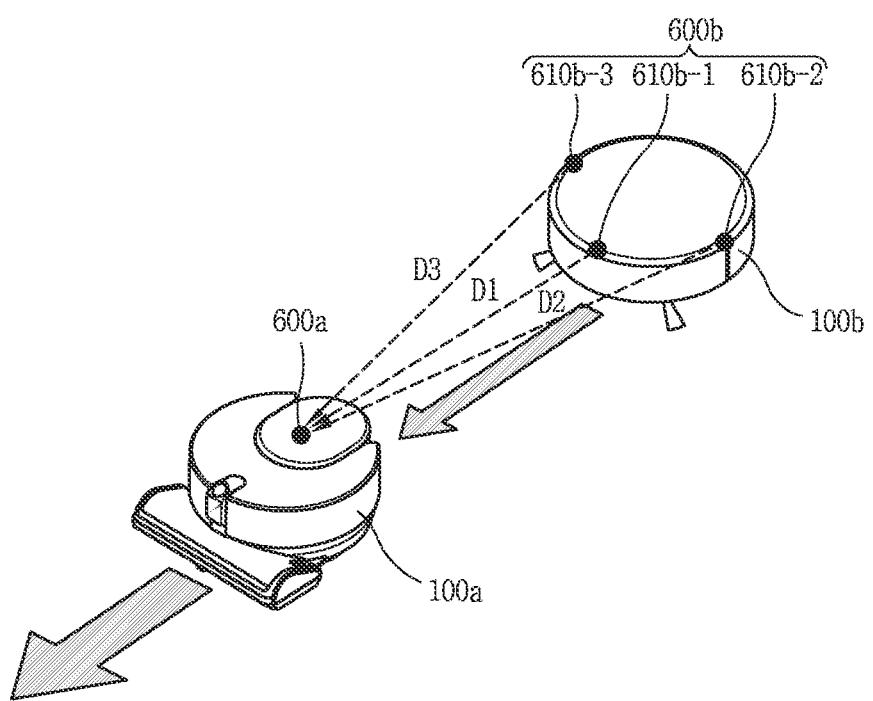
FIGS. 6A and 6B are conceptual views illustrating a method of determining relative positions of a first mobile robot and a second mobile robot using infrared sensors in accordance with one embodiment of the present disclosure.
Figure 6B:
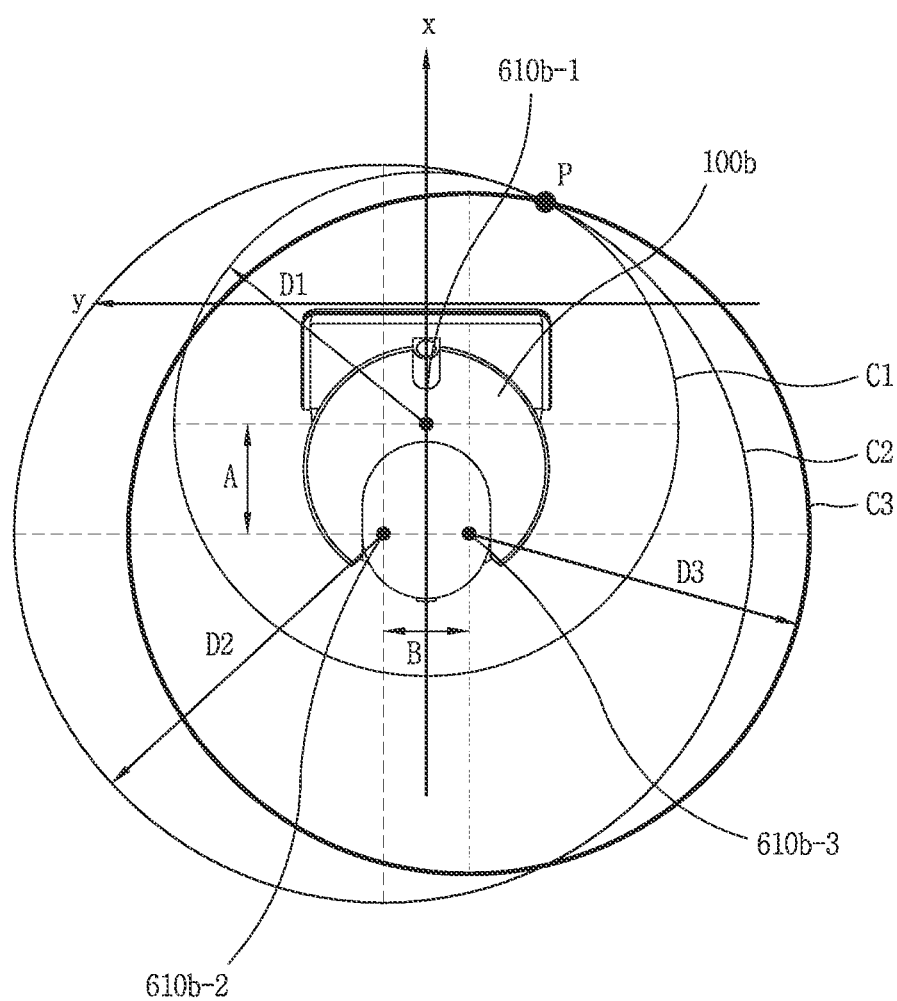

FIGS. 6A and 6B are conceptual views illustrating a method of determining relative positions of a first mobile robot and a second mobile robot using IR sensors in accordance with one embodiment of the present disclosure.

The present disclosure may include a transmitting optical sensor (IR sensor or laser sensor) and a receiving optical sensor (IR sensor or laser sensor) in order to recognize the relative positions of the first mobile robot 100a and the second mobile robot 100b. For example, one transmitting IR sensor and three receiving IR sensors may be used.

For example, the transmitting IR sensor may be mounted on the first mobile robot 100a among the plurality of cleaners, and the receiving IR sensors may be mounted on the second mobile robot 100b.

In this specification, the IR sensor may be a sensor capable of emitting or receiving infrared rays having a specific wavelength or a wavelength of a specific wavelength band among infrared wavelength bands (for example, 25 micrometers or more).

Here, the infrared sensor may be referred to as first type sensors 600a and 600b.

As shown in FIG. 6A, the first type sensors (IR sensors) may include a first type transmitting sensor 600a and a first type receiving sensor 600b.

The transmitting IR sensor 600a may be provided on the first mobile robot 100a as the leading cleaner, for example, on an outer circumferential surface of a main body of the first mobile robot 100a.

The receiving IR sensor 600b may be provided on the second mobile robot 100b, which is the following cleaner.

As illustrated in FIG. 6A, the receiving IR sensor 600b may be provided in plural.

For example, the receiving IR sensors 600b may include a first receiving IR sensor 610b-1, a second receiving IR sensor 610b-2, and a third receiving IR sensor 610-b. The first to third receiving IR sensors 610b-1, 610b-2, and 610b-3 may be mounted on the outer circumferential surface of the main body of the second mobile robot 100b at different positions.

In this case, the first to third receiving IR sensors 610b-1, 610b-2, and 610b-3 may be spaced apart from one another on the outer circumferential surface of the main body of the second mobile robot 100b.

On the other hand, the control unit 1800 of the second mobile robot 100b may receive laser light or laser beam, which is output from the transmitting IR sensor 600a provided on the first mobile robot 100a, through the receiving IR sensor 600b.

At this time, the control unit 1800 of the second mobile robot 100b may measure intensities of laser beams received in the first to third receiving IR sensors 610b-1, 610b-2, and 610b-3 included in the receiving IR sensor 600b.

The control unit of the second mobile robot 100b, as illustrated in FIG. 6B, may apply triangulation based on the intensities of the laser beams measured in the first to third receiving IR sensors 610b-1, 610b-2, 610b-3.

Brief description of triangulation using intensity of laser light will be given. The control unit of the second mobile robot 100b may calculate a first distance D1 from the first receiving IR sensor 610b-1 based on intensity of laser light received in the first receiving IR sensor 610b-1.

At this time, the first distance D1 may be decided by multiplying intensity of laser light by scale, and the scale may be decided through experiments.

For example, the radius may be shortened as the intensity of the laser light is great. That is, the radius and the intensity of the laser light may be in inverse proportion.

Likewise, the control unit of the second mobile robot 100b may calculate a second distance D2 from the second receiving IR sensor 610b-2 based on intensity of laser light received in the second receiving IR sensor 610b-2.

In addition, the control unit of the second mobile robot 100b may calculate a third distance D2 from the third receiving IR sensor 610b-3 based on intensity of laser light received in the third receiving IR sensor 610b-3.

Afterwards, as illustrated in FIG. 6B, the control unit of the second mobile robot 100b may extract (calculate, decide, determine) three circles C1, C2, and C3 respectively having radiuses of the first to third distances D1, D2, and D3 calculated with respect to the receiving IR sensors, and an intersection (intersection point) P of the three circles. The control unit of the second mobile robot may determine the intersection as the position of the first mobile robot (the position of the transmitting IR sensor, more accurately).

At this time, the first to third receiving IR sensors 610b-1, 610b-2, and 610b-3 may be arranged at different positions on the second mobile robot 100b, and coordinates of the arranged positions may be stored in the control unit of the mobile robot 100b.

The first to third receiving infrared sensors 610b-1, 610b-2, and 610b-3 may have different distances from the transmitting IR sensor 600a of the first mobile robot 100a, and thus have different intensity of laser light output from the first type transmitting sensor 600a.

Therefore, the control unit of the second mobile robot 100b can decide the first to third distances D1, D2, and D3 with respect to the respective sensors based on intensities of laser light received through the first to third receiving IR sensors 610b-1, 610b-2, and 610b-3, and decide the intersection P of the circles C1, C2, and C3, which have the first to third distances as radiuses, as the position of the first mobile robot 100a.

More specifically, the control unit of the second mobile robot 100b may calculate an intersection of a first circle in which the first IR sensor 610b-1 is a center point and the first distance is a radius, a second circle in which the second IR sensor 610b-2 is a center point and the second distance is a radius, and a third circle in which the third IR sensor 610b-3 is a center point and the third distance is a radius, as position coordinates (spatial coordinates) of the first mobile robot.

That is, the intersection P may be formed as spatial coordinates, and the relative positions of the first mobile robot 100a and the second mobile robot 100b may be recognized by using the spatial coordinates.

With this configuration, the present disclosure can provide mobile robots in which relative positions of a plurality of cleaners can be recognized by using inexpensive IR sensors.

On the other hand, when the IR sensor is used, if an obstacle is present between the first mobile robot 100a and the second mobile robot 100b, the reception of the laser light is interrupted, and the relative positions of the first and second mobile robots cannot accurately be recognized.

To solve this problem, as illustrated in FIGS. 6A and 6B, the present disclosure can measure the relative positions of the first mobile robot and the second mobile robot by using UWB modules instead of the transmitting/receiving IR sensors.

Figure 7A:
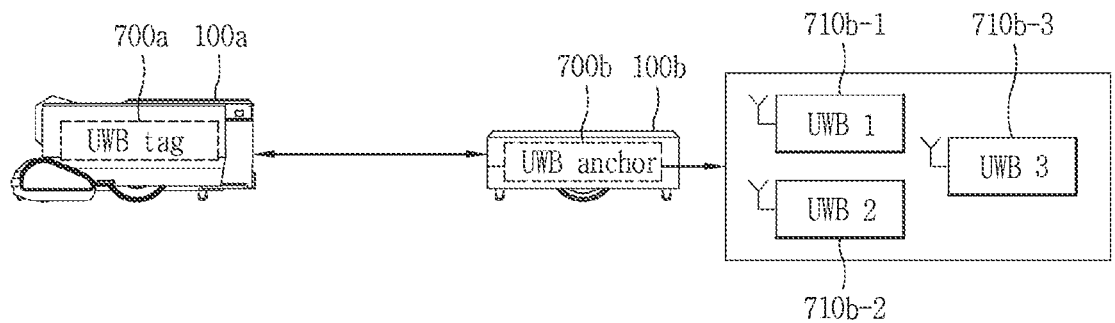
FIGS. 7A and 7B are conceptual views illustrating a method of determining relative positions of a first mobile robot and a second mobile robot using UWB modules in accordance with one embodiment of the present disclosure.
Figure 7B:
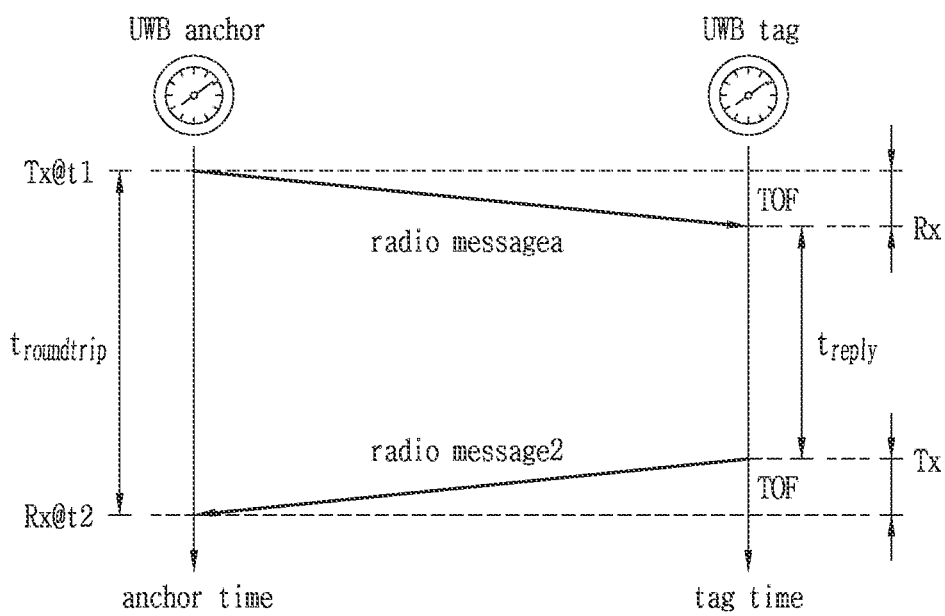

FIGS. 7A and 7B are conceptual views illustrating a method of determining relative positions of a first mobile robot and a second mobile robot using UWB modules in accordance with one embodiment of the present disclosure.

As described above, the UWB module (or UWB sensor) may be included in the communication units 1100 of the first mobile robot 100a and the second mobile robot 100b. In view of the fact that the UWB modules are used to sense the relative positions of the first mobile robot 100a and the second mobile robot 100b, the UWB modules may be included in the sensing units 1400 of the first mobile robot 100a and the second mobile robot 100b.

The first mobile robot 100a may include a transmitting UWB module 700a for transmitting ultra-wideband (UWB) signals. The transmitting UWB module may be termed as a second type transmitting sensor or a UWB tag.

The second mobile robot 100b may include a receiving UWB module 700b for receiving the UWB signals output from the transmitting UWB module 700a provided in the first mobile robot 100a. The receiving UWB module may be named as a second type receiving sensor or a UWB anchor.

UWB signals transmitted/received between the UWB modules may be smoothly transmitted and received within a specific space.

Accordingly, even if an obstacle exists between the first mobile robot 100a and the second mobile robot 100b, if the first mobile robot 100a and the second mobile robot 100b exist within a specific space, they can transmit and receive the UWB signals. This may mean that accuracy is increased.

The first mobile robot and the second mobile robot according to the present disclosure can measure time of each signal transmitted and received between the UWB tag and the UWB anchor to recognize a distance (spaced distance) between the first mobile robot and the second mobile robot.

In general, the UWB tag and the UWB anchor are both UWB modules, which may be modules to transmit and receive UWB signals.

For example, the UWB module included in one robot 100b for calculating (determining) a relative position of another mobile robot 100a may be referred to as a UWB anchor, and a UWB module included in the robot 100a whose relative position is to be recognized may be referred to as a UWB tag.

Specifically, for example, each of the plurality of mobile robots 100a and 100b may be provided with one UWB sensor, or the first mobile robot 100a may be provided with a single UWB sensor, and the second mobile robot 100b following up the first mobile robot 100a may be provided with a single UWB sensor and at least one antenna or provided with at least two UWB sensors, so that the first mobile robot 100a can measure distances to the second mobile robot 100b at two different time points t1 and t2.

The UWB sensor of the first mobile robot 100a and the UWB sensor of the second mobile robot 100b radiate UWB signals to each other, and measure distances and relative speed using Time of Arrival (ToA) or Time of Flight (ToF) which is a time that the signals come back by being reflected from the robots. However, the present disclosure is not limited to this, and may recognize the relative positions of the plurality of mobile robots 100a and 100b using a Time Difference of Arrival (TDoA) or Angle of Arrival (AoA) positioning technique.

For example, as shown in FIG. 7B, the control unit 1800 of the second mobile robot 100b may output a first signal (Radio message 1) at the UWB anchor of the second mobile robot.

The first signal may be received in the UWB tag of the first mobile robot 100a.

The control unit 1800 of the first mobile robot 100a may output a second signal (Radio message 2) in response to the reception of the first signal.

The control unit 1800 of the second mobile robot 100b may receive the second signal through the UWB anchor 700b.

The second signal may include delay time (t_reply) information which is calculated based on a time at which the first mobile robot 100a has received the first signal and a time at which the first mobile terminal 100a has output the second signal.

The control unit of the second mobile robot 100b may calculate a signal transmission time, namely, Time of Flight (ToF) between the first mobile robot and the second mobile robot using an output time t1 of the first signal, a received time t2 of the second signal, and the delay time t_reply included in the second signal.

The control unit 1800 of the second mobile robot 100b may calculate a distance between the first mobile robot 100a and the second mobile robot 100b (accurately, a distance between the UWB tag and the UWB anchor) using the output time t1 of the first signal, the received time t2 of the second signal, and the delay time t_reply included in the second signal. Here, c in FIG. 7B denotes speed of light.

Hereinafter, description will be given of a method of determining the relative positions of the first mobile robot 100a and the second mobile robot 100b using an AoA positioning technique. In order to use the AoA (Angle of Arrival) positioning technique, each of the first mobile robot 100a and the second mobile robot 100b should be provided with one receiver antenna or a plurality of receiver antennas. The first mobile robot 100a and the second mobile robot 100b may determine their relative positions using a difference (or phase difference) of angles that the receiver antennas provided in the robots, respectively, receive signals. To this end, each of the first mobile robot 100a and the second mobile robot 100b must be able to sense an accurate signal direction coming from the receiver antenna array.

Since signals, for example, UWB signals, generated in the first mobile robot 100a and the second mobile robot 100b, respectively, are received only in specific directional antennas, they can determine (recognize) received angles of the signals. Under assumption that positions of the receiver antennas provided in the first mobile robot 100a and the second mobile robot 100b are known, the relative positions of the first mobile robot 100a and the second mobile robot 100b may be calculated based on signal receiving directions of the receiver antennas.

At this time, if one receiver antenna is installed, a 2D position may be calculated in a space of a predetermined range. On the other hand, if at least two receiver antennas are installed, a 3D position may be determined. In the latter case, a distance d between the receiver antennas is used for position calculation in order to accurately determine a signal receiving direction.

For example, one UWB tag may be provided in the first mobile robot 100a, and at least two UWB anchors may be provided in the second mobile robot 100b. At this time, the second mobile robot 100b may receive UWB signals transmitted from the UWB tag of the first mobile robot 100a through the at least two UWB anchors.

Thereafter, the second mobile robot 100b may determine position information(or angle information) where the first mobile robot 100a is located with reference to a forward direction of the second mobile robot 100b, by using a phase difference between the UWB signals received through the at least two UWB anchors and a distance between the at least two UWB anchors.

That is, the second mobile robot of the present disclosure may extract distance information between the first mobile robot and the second mobile robot using the ToF scheme, and determine direction information (or angle information) in which the first mobile robot is located with respect to the forward direction of the second mobile robot 100b using the AoA scheme. Further, the second mobile robot may determine the relative position of the first mobile robot using the distance information and the angle information.

On the other hand, as illustrated in FIG. 7A, the second mobile robot 100b may be provided with a plurality of UWB anchors (a plurality of receiving UWB modules).

For example, the second mobile robot 100b may include three UWB anchors, and the three UWB anchors may include a first UWB anchor 710b-1, a second UWB anchor 710b-2, and a third UWB anchor 710b-3.

The present disclosure can calculate the relative positions (spatial coordinates) of the first mobile robot 100a and the second mobile robot 100b using the plurality of UWB anchors. The triangulation described in FIG. 6B will be equally/similarly applied to calculating the relative positions of the first mobile robot and the second mobile robot using three UWB anchors and one UWB tag.

For example, the second mobile robot 100b may control each of the first to third UWB anchors 710b-1, 710b-2, and 710b-3 and extract distances between the first to third UWB anchors and the UWB tag 700a provided in the first mobile robot 100a.

The configuration described in FIG. 7B will be equally/similarly applied to extracting the distance between each UWB anchor provided in the second mobile robot 100b and the UWB tag 700a provided in the first mobile robot 100a.

For example, the control unit 1800a of the second mobile robot 100b may extract a first distance between the first UWB anchor 710b-1 and the UWB tag 700a, a second distance between the second UWB anchor 710b-2 and the UWB tag 700a, and a third distance between the third UWB anchor 710b-3 and the UWB tag 700a, respectively.

Afterwards, the control unit 1800a of the second mobile robot 100b may calculate an intersection of a first circle in which the first UWB anchor 710b-1 is a center point and the first distance is a radius, a second circle in which the second UWB anchor 710b-2 is a center point and the second distance is a radius, and a third circle in which the third UWB anchor 710b-3 is a center point and the third distance is a radius, as position coordinates (spatial coordinates) of the first mobile robot.

In this manner, according to the present disclosure, the relative positions (or spatial coordinates) of the first mobile robot 100a and the second mobile robot 100a can be calculated in the triangulation manner by using the one UWB tag 700a and the three UWB anchors 710b-1, 710b-2 and 710b-3.

That is, when one UWB tag and one UWB anchor are used, the distance between the first mobile robot and the second mobile robot may be extracted, but the relative positions (i.e., spatial coordinates) may not be extracted. Accordingly, the present disclosure can extract even the relative positions of the first mobile robot and the second mobile robot using one UWB tag and three UWB anchors.

On the other hand, if one UWB tag and three UWB anchors are used to extract the relative positions of the first mobile robot and the second mobile robot, the highest accuracy is obtained but cost increase occurs.

In case where the laser sensors described with reference to FIGS. 6A and 6B are used, if an obstacle is present between the first mobile robot and the second mobile robot, laser transmission and reception is interrupted in view of the laser characteristic. Accordingly, when only the laser sensor is used, the determination of the relative positions of the first mobile robot and the second mobile robot becomes inaccurate.

In addition, when the UWB modules described with reference to FIGS. 7A and 7B are used, the relative positions of the first mobile robot and the second mobile robot can be accurately extracted regardless of existence of an obstacle between the first mobile robot and the second mobile robot. However, there is a problem that cost increases.

Hereinafter, various embodiments of the present disclosure for measuring accurate relative positions of the first mobile robot and the second mobile robot while reducing costs will be described in more detail with reference to the accompanying drawings.

To overcome and obviate the aforementioned problems, the present disclosure can utilize a pair of optical sensors (infrared sensors or laser sensors), one transmitting UWB module, and two receiving UWB modules.

Figure 8A:
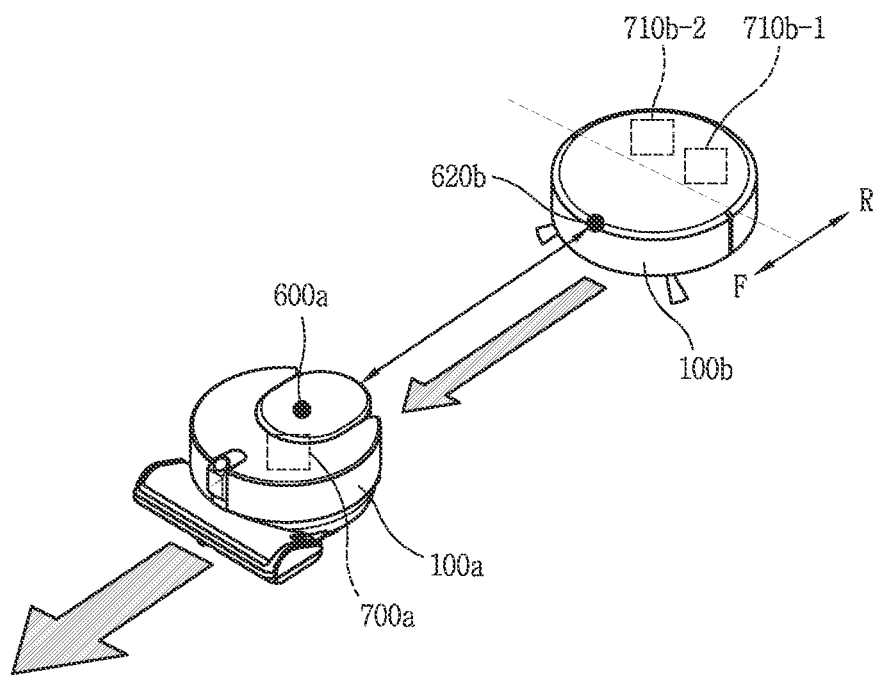
Figure 8B:
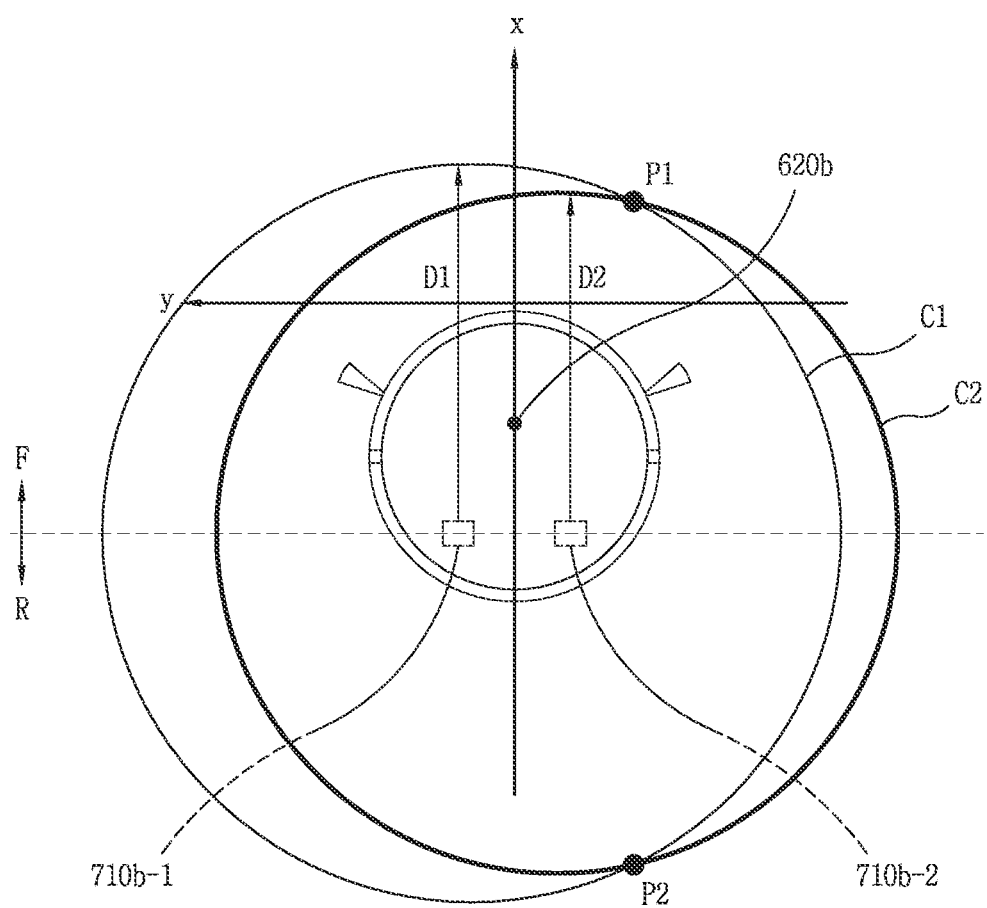

FIGS. 8A, 8B, and 9 are conceptual views and a flowchart illustrating a method of determining relative positions of a first mobile robot and a second mobile robot using UWB modules and laser sensors according to one embodiment of the present disclosure.

A plurality of autonomous mobile robots according to the present disclosure may include a first mobile robot 100a and a second mobile robot 100b. The first mobile robot 100a may serve as a leading or master cleaner that travels in a direction ahead of the second mobile robot 100b, and the second mobile robot 100b may serve as a following or slave cleaner that follows up the first mobile robot 100a.

In order to determine relative positions of the first mobile robot and the second mobile robot, the first mobile robot 100a of the present disclosure may include a transmitting optical sensor for outputting laser light or beam and a module for transmitting and receiving UWB signals.

In addition, the second mobile robot 100b may include a receiving optical sensor for receiving the laser beam and a plurality of modules for transmitting and receiving the UWB signals.

Specifically, the optical sensor for outputting or receiving the laser light may be an infrared sensor (or laser sensor). The module for transmitting and receiving the UWB signal may be a UWB module.

The UWB module may be included in the communication unit as described above. With no limit to this, the UWB module may also be formed as a separate module or sensor.

The UWB module may include a UWB tag (first module) and a UWB anchor (second module).

For example, the UWB tag may serve as a transmitting UWB module, and the UWB anchor may serve as a receiving UWB module. However, the present disclosure is not limited to this, and the UWB tag may also receive a UWB signal, and the UWB anchor may also output a UWB signal.

As illustrated in FIG. 8A, the first mobile robot 100a may be provided with one transmitting IR sensor 600a and one UWB tag 700a (first module).

The second mobile robot 100b may be provided with one receiving IR sensor 620b and two UWB anchors 710b-1 and 710b-2 (a plurality of second modules).

The two UWB anchors 710b-1 and 710b-2 may be disposed at different positions of the second mobile robot 100b and may be mounted with a distance therebetween.

The receiving IR sensor 620b provided in the second mobile robot may receive only laser light transmitted in one direction (for example, forward, backward, left or right direction) of the second mobile robot 100b.

In other words, when the receiving IR sensor 620b is disposed on the front of the second mobile robot 100b, the receiving IR sensor 620b may receive only laser beam transmitted from the front of the second mobile robot 100b.

In another example, when the receiving IR sensor 620b is disposed on the rear of the second mobile robot 100b, the receiving IR sensor 620b may receive only laser beam transmitted from the rear of the second mobile robot 100b.

In this specification, for convenience of explanation, it is assumed that the receiving IR sensor 620b is arranged to receive only laser light transmitted from the front side F of the second mobile robot 100b.

However, the receiving IR sensor 620b may alternatively be arranged to receive only laser light transmitted from the rear or side with respect to the second mobile robot 100b. In this case, the description given with respect to the front herein will be equally/similarly be applied.

That is, the second mobile robot 100b may be provided with the receiving IR sensor 620b to receive only laser light transmitted from the front side F of the second mobile robot.

To this end, as illustrated in FIG. 6B, the receiving IR sensor 620b may be provided on an upper outer circumferential surface of the second mobile robot, and walls for blocking the sides and rear except for the front may also be formed around the receiving IR sensor 620b.

The receiving optical sensor 620b of the second mobile robot 100b may also be disposed on an area, which faces one direction (e.g., the front of the second mobile robot), of a side surface of the second mobile robot 100b, so as to receive only laser light transmitted in the one direction of the second mobile robot 100b.

For example, the receiving optical sensor 620b of the second mobile robot 100b may be disposed on an area located at the front of a side surface of the second mobile robot 100b, so as to receive only laser light transmitted from the front of the second mobile robot 100b.

As another example, the receiving optical sensor 620b of the second mobile robot 100b may be disposed on an area, facing the front of the second mobile robot 100b, of a boundary between a front or upper surface and a side surface of the second mobile robot 100b, so as to receive only laser light transmitted from the front of the second mobile robot 100b.

Also, the receiving optical sensor of the second mobile robot 100b may be disposed on an upper surface of the second mobile robot, and a blocking member (not shown) may further be provided in the vicinity of the receiving optical sensor to allow only laser light transmitted from the front of the second mobile robot 100b to be received.

On the other hand, the transmitting optical sensor of the first mobile robot 100*a* may be configured to output laser light in all directions or in only one direction (e.g., to the rear of the first mobile robot).

When the transmitting optical sensor of the first mobile robot 100*a* is configured to output laser light only in one direction (e.g., to the rear of the first mobile robot 100*a*), the transmitting optical sensor of the first mobile robot 100*a* may be disposed on an area, facing the one direction (i.e., the rear of the first mobile robot), of a side surface of the first mobile robot 100*a*.

Hereinafter, description will be given in more detail of a method in which the second mobile robot determines the relative position of the first mobile robot using one transmitting IR sensor and one UWB tag provided in the first mobile robot and one receiving IR sensor and two UWB anchors provided in the second mobile robot.

Referring to FIG. 9, the control unit of the second mobile robot may control the UWB anchor to output a UWB signal (S902). For example, the control unit of the second mobile robot may control at least one of the two UWB anchors to output the UWB signal.

The UWB signal output from the UWB anchor may serve as a trigger signal for starting a process of determining the relative position of the first mobile robot.

The control unit of the first mobile robot 100*a* may receive the UWB signal through the UWB tag 700*a*. The control unit of the first mobile robot 100*a* may output the UWB signal through the UWB tag, in response to the reception of the UWB signal (S904).

In addition, the control unit of the first mobile robot 100*a* may output laser beam through the transmitting optical sensor (transmitting IR sensor) and outputs the UWB signal through the UWB tag, in response to the reception of the UWB signal.

The two UWB anchors provided in the second mobile robot 100*b* may include a first UWB anchor 710*b*-1 and a second UWB anchor 710*b*-2. In addition, the second mobile robot 100*b* may be provided with the first UWB anchor 710*b*-1 and the second UWB anchor 710*b*-2 disposed at different positions.

The control unit of the second mobile robot 100*b* may receive the UWB signal through the first and second UWB anchors (the plurality of second modules).

The control unit of the second mobile robot 100*b* may calculate a first distance D1 between the first UWB anchor 710*b*-1 and the UWB tag 700*a* and a second distance D2 between the second UWB anchor 720*b*-2 and the UWB tag 700*a*, in response to the reception of the UWB signal output in the UWB tag 700*a* through the first and second UWB anchors 710*b*-1 and 720*b*-2. The description given with reference to FIG. 7B will be equally/similarly applied to the method of calculating (measuring) the first distance D1 and the second distance D2.

Afterwards, the control unit of the second mobile robot 100*b*, as illustrated in FIG. 8B, may extract two intersections P1 and P2 of a first circle C1, wherein the first UWB anchor 710*b*-1 is a center of the first circle and the first distance D1 is a radius of the first circle, and a second circle C2, wherein the second UWB anchor 710*b*-2 is a center of the second circle, and the second distance D2 is a radius of the second circle (S908).

In this embodiment, since only two receiving UWB modules are used instead of three receiving UWB modules, the triangulation method cannot be applied. Accordingly, two coordinate values (intersection points) estimated as the relative positions of the first mobile robot are generated.

To solve this problem, the embodiment of the present disclosure may use a pair of IR sensors 600*a* and 620*b* for determining a direction of the first mobile robot.

The control unit of the second mobile robot 100*b* may determine the relative position of the first mobile robot 100*a*, based on the received UWB signal and reception or non-reception of the laser light output from the transmitting optical sensor of the first mobile robot 100*a*.

The control unit of the second mobile robot 100*b* may extract the two intersections using the received UWB signal. Hereinafter, description will be given of a method in which the second mobile robot 100*b* determines the relative position of the first mobile robot 100*a* based on two intersections extracted through the received UWB signal and whether or not the laser light has been received.

Referring back to FIG. 9, the control unit of the first mobile robot 100*b* may control the transmitting IR sensor to output laser light, in response to the reception of the UWB signal in the UWB tag of the first mobile robot after the step S902 (S910).

At this time, the control unit of the first mobile robot 100*b* may also output laser light through the transmitting IR sensor while outputting the UWB signal through the UWB tag or may output the UWB signal and the laser light with a predetermined time interval, in the step S904.

The control unit of the second mobile robot 100*b* may determine whether laser light has been received through the receiving IR sensor 620*b* (S912).

For example, when the laser beam is received through the receiving IR sensor 620*b* which is configured to receive only laser light transmitted from the front of the second mobile robot 100*b*, the control unit of the second mobile robot 100*b* may determine that the first mobile robot 100*a* is located at the front F of the second mobile robot 100*b* (S914).

As another example, when the laser beam has not been received through the receiving IR sensor 620*b* which is configured to receive only laser beam transmitted from the front of the second mobile robot 100*b*, the control unit of the second mobile robot 100*b* may determine that the first mobile robot 100*a* is located at the rear R of the second mobile robot 100*b*.

That is, the control unit of the second mobile robot 100*b* may determine one of the two intersections P1 and P2 as the relative position (or spatial coordinates) of the first mobile robot, based on whether or not the laser light has been received through the receiving IR sensor which is configured to receive only the laser light transmitted from the front of the second mobile robot (S918).

Referring to FIG. 8B, when the laser light is received through the receiving IR sensor 620*b*, the control unit of the second mobile robot 100*b* may determine the intersection P1 located at the front F of the second mobile robot 100*b* of the two intersections P1 and P2 as the relative position of the first mobile robot 100*a*.

On the other hand, when the laser beam is not received through the receiving IR sensor 620*b*, the control unit of the second mobile robot 100*b* may determine the intersection P2 located at the rear of the second mobile robot 100*b* of the two intersections as the relative position of the first mobile robot 100*a*.

The present disclosure can provide a plurality of autonomous mobile robots capable of accurately determining a relative position of a first mobile robot while reducing costs.

The present disclosure can provide a plurality of autonomous mobile robots, capable of improving accuracy of a relative position of a first mobile robot, in a manner of determining the relative position of the first mobile robot through triangulation using ultrasonic sensors and calibrating the relative position using a pair of UWB modules.

Meanwhile, the control unit of the first mobile robot of the present disclosure may control the UWB tag to output the UWB signal and simultaneously control the transmitting IR sensor to output laser light.

In this case, the control unit of the second mobile robot 100b may determine that the first mobile robot 100a has output laser light when the UWB anchor receives the UWB signal.

At this time, the control unit of the second mobile robot 100b may determine whether the laser beam is received through the receiving IR sensor, and determine whether the first mobile robot is located at the front or at the rear of the second mobile robot based on the determination of the reception of the laser light.

The present disclosure can provide a plurality of autonomous mobile robots capable of accurately determining a relative position of a first mobile robot while reducing costs.

The present disclosure can provide a plurality of autonomous mobile robots, capable of reducing cost while improving accuracy by calculating two accurate intersection points using two UWB modules provided in a second mobile robot and determining whether the first mobile robot exists in the front or rear using a low-cost laser sensor.

Still another aspect of the present disclosure is to provide mobile robots, capable of recognizing relative positions of a plurality of mobile robots, irrespective of a communication state between the plurality of mobile robots and a server, and a control method thereof.

The functions/operations/control methods performed by the first mobile robot 100a disclosed herein may be performed by the control unit of the first mobile robot 100a or the control unit of the second mobile robot 100b, and the functions/operations/control methods performed by the second mobile robot 100b may be performed by the control unit of the second mobile robot 100b or the control unit of the first mobile robot 100a.

In addition, the present disclosure may allow the second mobile robot 100b to determine the relative position of the first mobile robot 100a.

Since the first mobile robot 100a is the leading cleaner and the second mobile robot 100b is the following cleaner following up the first mobile robot 100b, the second mobile robot 100b can more easily follow the first mobile robot 100a by recognizing the relative position of the first mobile robot 100a, which may result in reducing accuracy of follow-up and calculation time of the relative position.

Since the first mobile robot has to perform many calculations such as detecting an obstacle according to a preset algorithm, creating map information, determining a cleaning progress direction, and so on, such calculation load of the first mobile robot can be reduced as the second mobile robot recognizes the relative position of the first mobile robot.

In this specification, description has been given of the example in which the second mobile robot 100b recognizes the relative position of the first mobile robot 100a, but the present disclosure is not limited to this.

In general, when a plurality of autonomous mobile robots exist and their follow-up control is performed, the first mobile robot may determine the relative position of the second mobile robot so as to increase accuracy and rapidity because the specification (Spec) of components provided in the first mobile robot as the leading robot is better than specification of components provided in the second mobile robot.

Accordingly, the present disclosure may allow the first mobile robot 100a to determine the relative position of the second mobile robot 100b.

To this end, the control unit of the second mobile robot 100b may transmit information calculated thereby to the first mobile robot 100a through the communication unit.

In this case, the control unit of the first mobile robot 100a may determine the relative position of the second mobile robot 100b (or the relative position of the first mobile robot 100a with respect to the second mobile robot 100b) based on the information received from the second mobile robot 100b through the communication unit.

In order to determine (decide) the relative position of the second mobile robot 100b, the first mobile robot 100a may include those components provided in the second mobile robot 100b and the second mobile robot 100b may include those components provided in the first mobile robot.

For example, the first mobile robot 100a may be provided with a sensor for receiving laser light, and the second mobile robot 100b may be provided with a sensor for outputting laser light. Also, a UWB anchor may be provided in the first mobile robot 100a, and a UWB tag may be provided in the second mobile robot 100b.

In this case, the control unit of the first mobile robot 100a may perform the functions/operations/control methods performed by the control unit of the second mobile robot 100b described in this specification, and the control unit of the second mobile robot 100b may perform the functions/operations/control methods performed by the control unit of the first mobile robot 100a.

Accordingly, the control unit of the first mobile robot 100a can determine the relative position of the second mobile robot 100b through the functions/operations/control methods performed by the control unit of the second mobile robot 100b.

When the first mobile robot 100a determines the relative position of the second mobile robot 100b, the first mobile robot 100a may transmit the determined relative position information of the second mobile robot 100b to the second mobile robot 100b. Further, the second mobile robot 100b may determine the relative position of the first mobile robot 100a based on the received relative position information of the second mobile robot.

Whether the first mobile robot 100a determines the relative position of the second mobile robot 100b or the second mobile robot 100b determines the relative position of the first mobile robot 100a may be decided at the time of product production, and may be determined/changed by user setting.

Figure 10A:
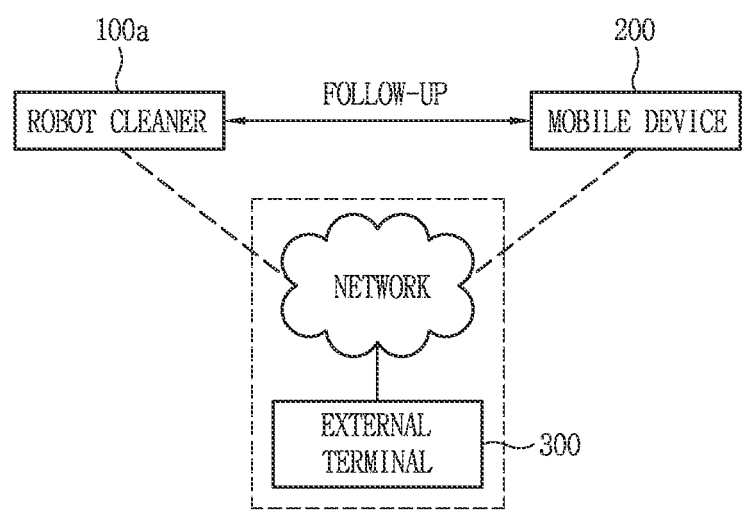
FIGS. 10A, 10B and 10C are conceptual views illustrating follow-up registration and follow-up control between a first mobile robot and a mobile device, according to an alternative embodiment of the present disclosure.
Figure 10B:
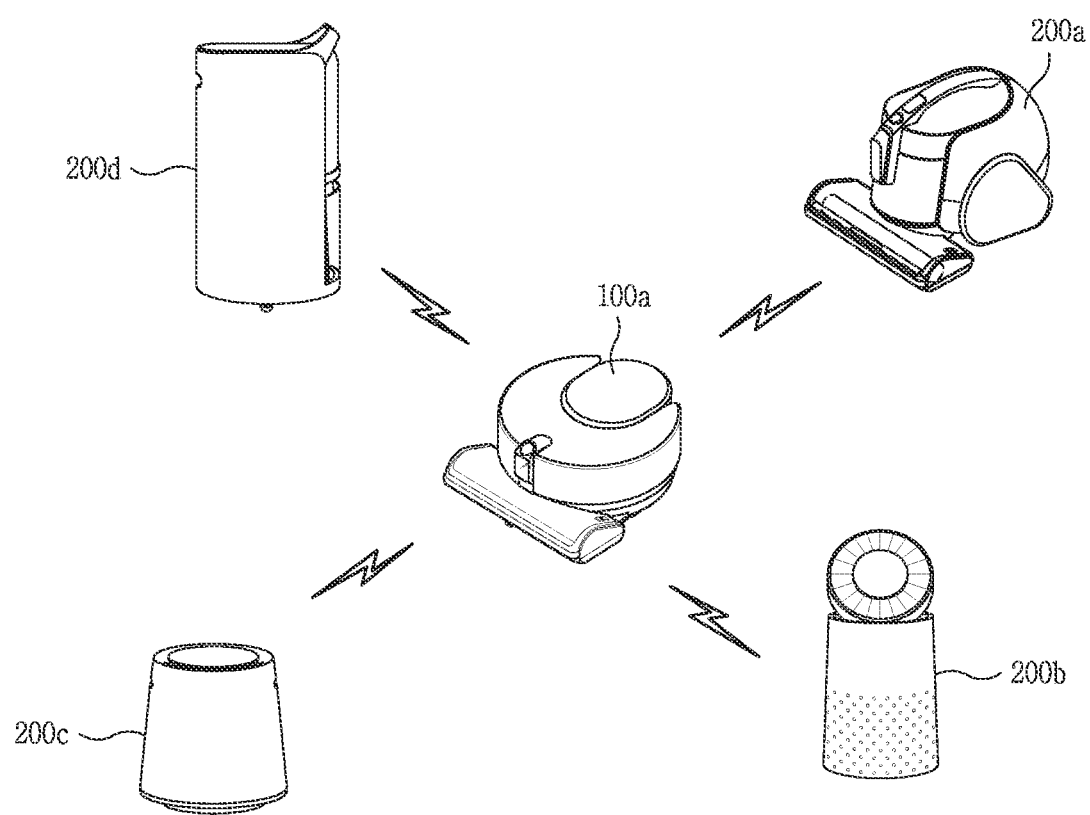
Figure 10C:
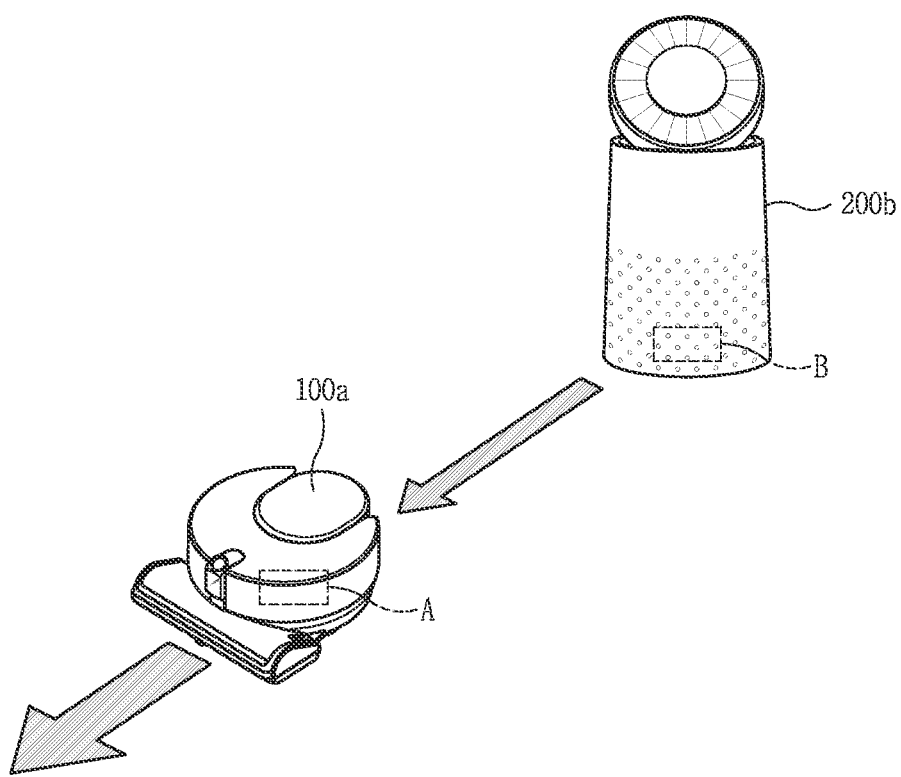

FIGS. 10A, 10B, and 10C are alternative embodiments of follow-up control between the first mobile robot and the second mobile robot in accordance with the present disclosure. Hereinafter, a follow-up control between the first mobile robot and a mobile device will be described in detail. Here, the follow-up control disclosed herein means only that the mobile device follows a movement path of the first mobile robot.

Referring to FIG. 10A, the first mobile robot 100a may control the follow-up of a mobile device 200 by communicating with the mobile device 200 instead of the second mobile robot.

Here, the mobile device 200 may not have a cleaning function, and may be any electronic device if it is provided with a driving function. For example, the mobile device 200 may include various types of home appliances or other electronic devices, such as a dehumidifier, a humidifier, an air purifier, an air conditioner, a smart TV, an artificial intelligent speaker, a digital photographing device, and the like, with no limit.

In addition, the mobile device 200 may be any device if it is equipped with a traveling function, and may not have a navigation function for detecting an obstacle by itself or traveling up to a predetermined destination.

The first mobile robot 100a is a mobile robot having both the navigation function and the obstacle detection function and can control the follow-up of the mobile device 200. The first mobile robot 100a may be a dry-type cleaner or a wet-type cleaner.

The first mobile robot 100a and the mobile device 200 can communicate with each other through a network (not shown), but may directly communicate with each other.

Here, the communication using the network is may be communication using, for example, WLAN, WPAN, Wi-Fi, Wi-Fi Direct, Digital Living Network Alliance (DLNA), Wireless Broadband (WiBro), World Interoperability for Microwave Access (WiMAX), etc. The mutual direct communication may be performed using, for example, UWB, Zigbee, Z-wave, Blue-Tooth, RFID, and Infrared Data Association (IrDA), and the like.

If the first mobile robot 100a and the mobile device 200 are close to each other, the mobile device 200 may be set to follow up the first mobile robot 100a through a manipulation in the first mobile robot 100a.

If the first mobile robot 100a and the mobile device 200 are far away from each other, although not shown, the mobile device 200 may be set to follow up the first mobile robot 100a through a manipulation in an external terminal 300 (see FIG. 5A).

Specifically, follow-up relationship between the first mobile robot 100a and the mobile device 200 may be established through network communication with the external terminal 300 (see FIG. 5A). Here, the external terminal 300 is an electronic device capable of performing wired or wireless communication, and may be a tablet, a smart phone, a notebook computer, or the like. At least one application related to follow-up control by the first mobile robot 100a (hereinafter, 'follow-up related application') may be installed in the external terminal 300. The user may execute the follow-up related application installed in the external terminal 300 to select and register the mobile device 200 subjected to the follow-up control by the first mobile robot 100a. When the mobile device 200 subjected to the follow-up control is registered, the external terminal may recognize product information of the mobile device, and such product information may be provided to the first mobile robot 100a via the network.

The external terminal 300 may recognize the position of the first mobile robot 100a and the position of the registered mobile device 200 through communication with the first mobile robot 100a and the registered mobile device 200. Afterwards, the first mobile robot 100a may travel toward the position of the registered mobile device 200 or the registered mobile device 200 may travel toward the position of the first mobile robot 100a according to a control signal transmitted from the external terminal 300. When it is detected that the relative positions of the first mobile robot 100a and the registered mobile device 200 are within a predetermined following distance, the follow-up control for the mobile device 200 by the first mobile robot 100a is started. After then, the follow-up control is performed by direct communication between the first mobile robot 100a and the mobile device 200 without the intervention of the external terminal 300.

The setting of the follow-up control may be released by the operation of the external terminal 300 or automatically terminated as the first mobile robot 100a and the mobile device 200 move away from the predetermined following distance.

The user can change, add or remove the mobile device 200 to be controlled by the first mobile robot 100a by manipulating the first mobile robot 100a or the external terminal 300. For example, referring to FIG. 10B, the first mobile robot 100a may perform the follow-up control for at least one mobile device 200 of another cleaner 200a or 100b, an air purifier 200b, a humidifier 200c, and a dehumidifier 200d.

Generally, since the mobile device 200 is different from the first mobile robot 100a in its function, product size, and traveling ability, It is difficult for the mobile device 200 to follow up the movement path of the mobile terminal 100a as it is. For example, there may be an exceptional situation in which it is difficult for the mobile device 200 to follow the movement path of the first mobile robot 100a according to a geographical characteristic of a space, a size of an obstacle, and the like. In consideration of such an exceptional situation, the mobile device 200 may travel or wait by omitting a part of the movement path even if it recognizes the movement path of the first mobile robot 100a. To this end, the first mobile robot 100a may detect whether or not the exceptional situation occurs, and control the mobile device 200 to store data corresponding to the movement path of the first mobile robot 100a in a memory or the like. Then, depending on situations, the first mobile robot 100a may control the mobile device 200 to travel with deleting part of the stored data or to wait in a stopped state.

FIG. 10C illustrates an example of a follow-up control between the first mobile robot 100a and the mobile device 200, for example, the air cleaner 200b having a traveling function. The first mobile robot 100a and the air purifier 200b may include communication modules A and B for determining relative positions thereof, respectively. The communication modules A and B may be one of modules for emitting and receiving an IR signal, an ultrasonic signal, a carrier frequency, or an impulse signal. The recognition of the relative positions through the communication modules A and B has been described above in detail, so a description thereof will be omitted. The air purifier 200b may receive traveling information corresponding to a traveling command (e.g., changes in traveling including a traveling direction and a traveling speed, traveling stop, etc.) from the first mobile robot 100a, travel according to the received traveling information, and perform air purification. Accordingly, the air purification may be performed in real time with respect to a cleaning space in which the first mobile robot 100a operates. In addition, since the first mobile robot 100a has already recognized the production information related to the mobile device 200, the first mobile robot 100a can control the air purifier 200b to record the traveling information of the first mobile robot 100a, and travel with deleting part of the traveling information or wait in a stopped state.

The present disclosure described above can be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 1800. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

What is claimed is:

1. A plurality of autonomous mobile robots, comprising:
   a first mobile robot including a transmitting optical sensor for outputting laser light and a UWB tag for transmitting and receiving an Ultra-Wideband (UWB) signal; and
   a second mobile robot including a receiving optical sensor for receiving the laser light and a plurality of UWB anchors for transmitting and receiving the UWB signal,
   wherein the second mobile robot comprises a controller configured to determine a relative position of the first mobile robot based on the UWB signal received through the plurality of UWB anchors and a determination of whether the laser light has been received by the receiving optical sensor,
   wherein:
   the second mobile robot comprises a first UWB anchor and a second UWB anchor included in the plurality of UWB anchors and located at different positions, and
   the controller of the second mobile robot is configured to determine a first distance between the first UWB anchor and the UWB tag and a second distance between the second UWB anchor and the UWB tag, in response to the UWB signal output from the UWB tag being received through the first and the second UWB anchors,
   wherein the controller of the second mobile robot is configured to determine two intersections between a first circle and a second circle, wherein the first UWB anchor is a center of the first circle and the first distance is a radius of the first circle, and wherein the second UWB anchor is a center of the second circle and the second distance is a radius of the second circle.

2. The plurality of autonomous mobile robots of claim 1, wherein the transmitting optical sensor and the receiving optical sensor are infrared sensors.

3. The plurality of autonomous mobile robots of claim 1, wherein:
   the first mobile robot comprises one transmitting optical sensor and one UWB tag, and the second mobile robot comprises one receiving optical sensor and two UWB anchors.

4. The plurality of autonomous mobile robots of claim 1, wherein the receiving optical sensor receives only laser light transmitted in one direction toward the second mobile robot.

5. The plurality of autonomous mobile robots of claim 1, wherein the receiving optical sensor is arranged to receive only laser light transmitted from a front of the second mobile robot relative to a direction of movement of the second mobile robot.

6. The plurality of autonomous mobile robots of claim 1, wherein:
   the controller of the second mobile robot is configured to control the UWB anchors to output the UWB signal, and
   a controller of the first mobile robot is configured to output the UWB signal through the UWB tag, in response to reception of the UWB signal from one of the UWB anchors.

7. The plurality of autonomous mobile robots of claim 1, wherein the controller of the second mobile robot is configured to determine one of two positions determined by the UWB tag and the plurality of UWB anchors as the relative position of the first mobile robot, based on whether the laser light is received through the receiving optical sensor.

8. The plurality of autonomous mobile robots of claim 7, wherein the controller of the second mobile robot is configured to determine a first position of the two determined positions that is located at a front of the second mobile robot relative to a direction of movement of the second mobile robot as the relative position of the first mobile robot, when the laser light is received through the receiving optical sensor, and to determine a second position of the two determined positions that is located at a rear of the second mobile robot as the relative position of the first mobile robot, when the laser light is not received through the receiving optical sensor.

9. A method for controlling a plurality of autonomous mobile robots including a first mobile robot and a second mobile robot, the method comprising:
   outputting, by the first mobile robot, laser light and an Ultra-Wideband (UWB) signal;
   receiving, by the second mobile robot, the UWB signal;
   determining, by the second mobile robot, a relative position of the first mobile robot, based on the received UWB signal and a determination of whether the laser light is received by an optical sensor on the second mobile robot;
   determining, by the second mobile robot, one of two positions determined by an UWB tag in the first mobile robot and a plurality of UWB anchors as the relative position of the first mobile robot, based on whether the laser light is received through the optical sensor; and
   determining two intersections between a first circle and a second circle, wherein a first UWB anchor in the second mobile robot is a center of the first circle and a first distance between the first UWB anchor and the UWB tag is a radius of the first circle, and wherein a second UWB anchor in the second mobile robot is a center of the second circle and a second distance between the second UWB anchor and the UWB tag is a radius of the second circle.

* * * * *